(12) United States Patent
Kekre et al.

(10) Patent No.: US 7,386,662 B1
(45) Date of Patent: Jun. 10, 2008

(54) COORDINATION OF CACHING AND I/O MANAGEMENT IN A MULTI-LAYER VIRTUALIZED STORAGE ENVIRONMENT

(75) Inventors: Anand A. Kekre, Pune (IN); Pradip Kulkarni, Pune (IN)

(73) Assignee: Symantec Operating Corporation, Cupertino, CA (US)

( * ) Notice: Subject to any disclaimer, the term of this patent is extended or adjusted under 35 U.S.C. 154(b) by 418 days.

(21) Appl. No.: 11/156,846

(22) Filed: Jun. 20, 2005

(51) Int. Cl.
*G06F 13/10* (2006.01)

(52) U.S. Cl. ..................................... 711/113
(58) Field of Classification Search ............ 711/113, 711/119, 154
See application file for complete search history.

(56) References Cited

U.S. PATENT DOCUMENTS

| | | | |
|---|---|---|---|
| 6,857,059 B2 | 2/2005 | Karpoff et al. | |
| 6,898,670 B2 | 5/2005 | Nahum | |
| 6,912,537 B2 | 6/2005 | Selkirk et al. | |
| 6,934,799 B2 | 8/2005 | Acharya et al. | |
| 7,007,147 B2 | 2/2006 | Eguchi et al. | |
| 2004/0098538 A1* | 5/2004 | Horn et al. | 711/113 |
| 2005/0097278 A1* | 5/2005 | Hsu et al. | 711/129 |

* cited by examiner

*Primary Examiner*—Kevin L. Ellis
(74) *Attorney, Agent, or Firm*—Meyertons Hood Kivlin Kowert & Goetzel, P.C.; B. Noël Kivlin

(57) ABSTRACT

Systems and methods are disclosed for performing cache and I/O management in a multi-layer storage virtualization environment. Block virtualization may be implemented at various layers, each with one or more storage entities. One storage entity may coordinate and leverage the cache and the caching mechanism available with another storage entity. The storage entities may be at the same layer (horizontal cache coordination) or at different layers (vertical cache coordination). Cache coordination may include application-assisted read-ahead.

20 Claims, 18 Drawing Sheets

COORDINATION OF CACHING AND I/O MANAGEMENT IN A MULTI-LAYER VIRTUALIZED STORAGE ENVIRONMENT

BACKGROUND

1. Field of the Invention

This invention relates to data storage and, more particularly, to storage techniques in data storage environments having multiple virtualized layers.

2. Description of the Related Art

Many business organizations and governmental entities rely upon applications that access large amounts of data, often exceeding a petabyte or more of data, for mission-critical applications. Often such data is stored on many different storage devices, which may be centrally located or distributed throughout an enterprise. Such storage devices may be heterogeneous in nature, including many different types of devices from many different manufacturers.

Configuring individual applications that consume data, or application server systems that host such applications, to recognize and directly interact with each different storage device that may possibly be encountered in a heterogeneous storage environment is increasingly difficult as the environment scales in size and complexity. Therefore, in some storage environments, specialized storage management software and hardware may be used to provide a more uniform storage model to storage consumers. Such software and hardware may also be configured to add to the storage model storage features not present in individual storage devices. For example, features to increase fault tolerance, such as data mirroring, snapshot/fixed image creation, or data parity, as well as features to increase data access performance, such as disk striping, may be implemented in the storage model via hardware or software.

Such features may be supplied in a storage model that includes block virtualization. Generally speaking, a block device may comprise a hardware or software entity that provides a collection of linearly addressed data blocks that can be read or written. In block virtualization, a number of virtualized block devices may be created out of one or more physical or logical block devices. Software and/or hardware may be used to rearrange blocks from one or more block devices (e.g., disks) and add various kinds of functions. The resulting rearranged collection of blocks may then be presented to a block device consumer, such as an application or a file system, as one or more aggregated devices with the appearance of one or more basic disk drives. That is, the more complex structure resulting from rearranging blocks and adding functionality may be presented as if it were one or more simple arrays of blocks, or logical block devices.

Volume managers supplied with operating systems may provide block virtualization in a homogenous, proprietary, or otherwise restricted storage environment. Therefore, such volume managers may not satisfy virtualization requirements in a heterogeneous storage environment. Block virtualization functionality may also be supplied by hardware vendors for their storage devices or by network vendors for their switches. Such virtualization functions are usually limited in their scope to a single layer and even a single device in the collection of physical devices. In a heterogeneous storage environment, however, there is no guarantee that virtualization products from a variety of vendors will function in a coordinated or cooperative manner.

SUMMARY

Various systems and methods for cache and I/O management in a multi-layer storage virtualization environment are disclosed. Block virtualization may be implemented at various layers in a multi-layer virtualization environment: for example, an application host layer, a fabric switch layer, a storage appliance layer, a storage device layer, and/or other suitable layers. In one embodiment, multi-layer virtualization may be coordinated by a metadata server. The metadata server may be configured to manage metadata for a plurality of storage objects and export that metadata to various storage entities. A storage object may assume the personality of a layer-specific storage construct such as a logical volume, a virtual LUN, a device, etc. The particular type of layer-specific storage construct assumed by a storage object may depend on the position of the storage object in the object hierarchy and/or the characteristics of the layer of virtualization that imports the corresponding storage object.

In one specific embodiment of the system, the multi-layer virtualization environment may be further configured to include cache coordination. One storage entity may coordinate and leverage the cache and the caching mechanism available with another storage entity. A method is contemplated that in one embodiment may include a first storage entity requesting a second storage entity to store data in a cache. The cache is managed by the second storage entity and readable by the first storage entity. The method may further include the data being read into the cache at the second storage entity. The method may further include the first storage entity reading the data from the cache. In various specific implementations, the storage entities may be at the same layer (horizontal cache coordination) or at different layers (vertical cache coordination).

In another embodiment, a particular region of storage may be cached at only one layer in an I/O path, since caching the same data at multiple layers may not provide an optimum utilization of the caching capabilities of the system. Coordination between the layers may be employed so that a first layer can free up cache entries if a second layer already has the same data cached.

In one embodiment of the system, the multi-layer virtualization environment may be further configured to include application-assisted read-ahead. A storage entity may identify a region of storage comprising data which is likely to be accessed by that storage entity. The storage entity may request or instruct a second storage entity to store the data in the cache of the second storage entity by pre-fetching the data from the region of storage. Application-assisted read-ahead may be performed in a horizontal manner (i.e., between storage entities at the same virtualization layer) or vertical manner (i.e., between storage entities at different virtualization layers).

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Block Virtualization

Figure 1:
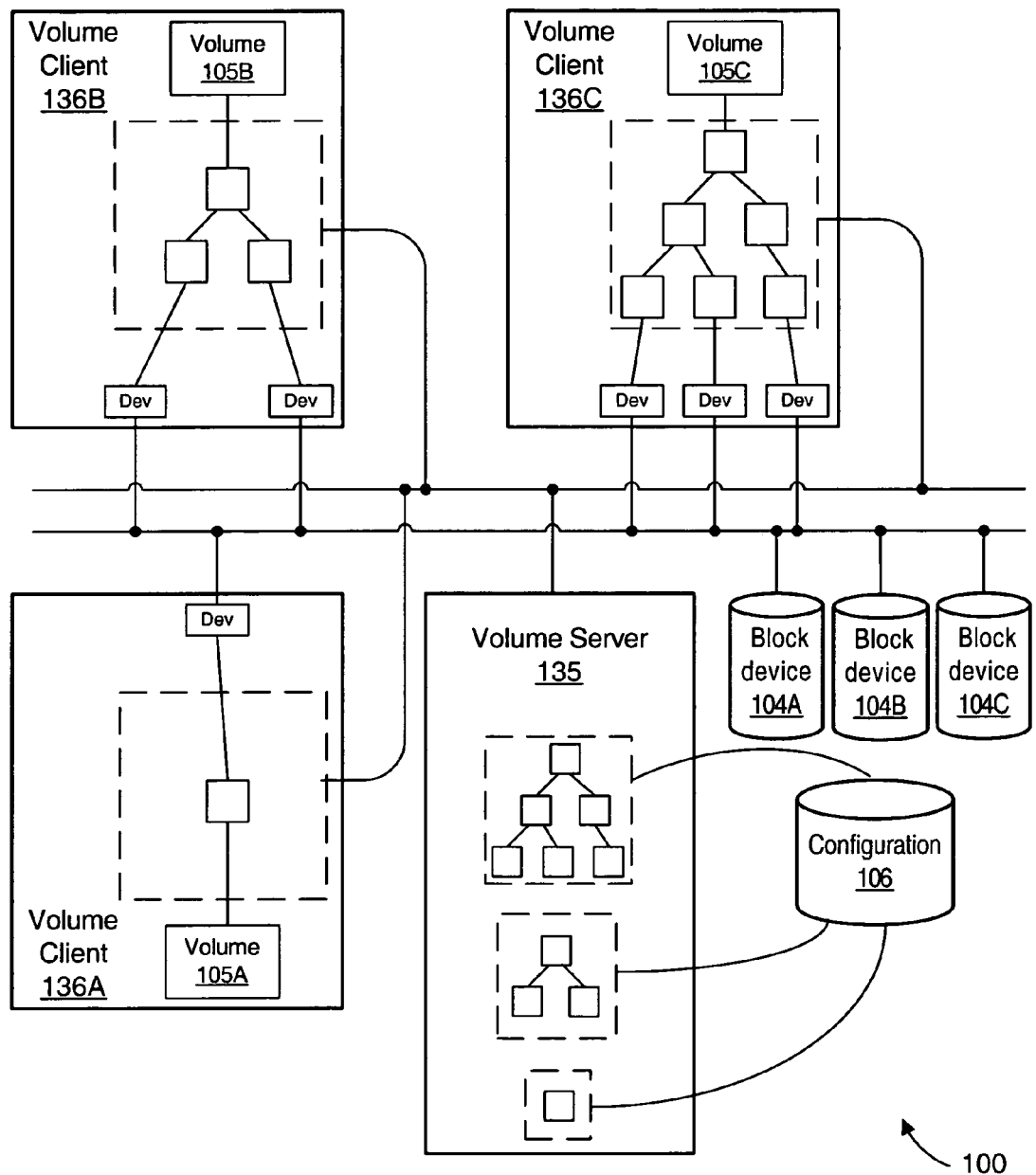
FIG. 1 is a block diagram illustrating one embodiment of a logical volume-based block virtualization system.

FIG. 1 illustrates a logical volume-based block virtualization system 100 according to one embodiment. In the illustrated embodiment, system 100 includes a plurality of block devices 104A-C (collectively, block devices 104) as well as a volume server 135 and a plurality of volume clients 136A-C (collectively, volume clients 136). Volume clients 136 may also be referred to herein as hosts 136. Volume server 135 is configured to obtain configuration information from a configuration database 106, and each of volume clients 136A-C is shown as having access to a respective volume 105A-C. Each of volumes 105 is associated with one or more logical storage objects, illustrated as a tree of logical objects.

Generally speaking, a block device 104 may comprise a hardware or software entity that provides a collection of linearly addressed data blocks that can be read or written. For example, in one embodiment a block device 104 may be a single disk drive configured to present all of its sectors as an indexed array of blocks. It is contemplated that any suitable type of storage device may be configured as a block device, such as fixed or removable magnetic media drives (e.g., hard drives, floppy or Zip-based drives), writable or read-only optical media drives (e.g., CD or DVD), tape drives, solid-state mass storage devices, or any other type of storage device. Block devices presented by physical storage devices may also be referred to as physical block devices. In some embodiments, a physical block device may be presented by a storage device residing on a storage network, such as a Small Computer System Interface (SCSI) device presented to a Storage Area Network (SAN) using a Fibre Channel, Infiniband, or Internet Protocol (IP) interface. In some embodiments, a block device 104 may also be a logical or virtual storage device resulting from a mapping of blocks of one or more physical storage devices, as described in greater detail below. Such block devices may also be referred to as logical or virtual block devices.

Hardware devices configured to provide a collection of linearly addressed data blocks may generally be referred to as physical block devices, and logical or virtual storage devices so configured may generally be referred to as logical or virtual block devices. It is contemplated that in some embodiments, data blocks may be uniformly sized across different physical and logical block devices, while in other embodiments physical and logical block devices may employ different block sizes. It is also contemplated that in some embodiments, block sizes may vary among particular physical block devices and/or particular logical block devices, or even within a given block device.

A block device may differ from a file in that it may not require use of a file system for access; that is, a consumer of a block device 104 may read or write blocks directly to the device, bypassing any file system that may be in use. In some embodiments, a block device 104 presented by an operating system for use by a consumer may present relatively few primitives through which the device may be manipulated. For example, in one embodiment a block device 104 may support open, close, read and write primitives, plus a few miscellaneous control and query primitives. In contrast, file systems may provide a richer set of primitives, such as support for creating and removing files, appending to files, creating and removing directories, etc. Typical interfaces to block devices may allow for higher raw throughput and greater concurrency than typical interfaces to single files of a file system. Block devices 104 that are physical storage devices, such as disks or tape drives, may be configured to present some form of SCSI interface, though other interfaces are possible and contemplated.

In block device virtualization, a number of virtual block devices may be created out of one or more physical or logical block devices. In one embodiment, physical storage devices such as disk arrays may also be configured to perform block virtualization. In one embodiment of block virtualization, one or more layers of software and/or hardware rearrange blocks from one or more block devices, such as disks, and add various kinds of functions. The resulting rearranged collection of blocks may then be presented to a block device consumer, such as an application or a file system, as one or more aggregated devices with the appearance of one or more basic disk drives. That is, the more complex structure resulting from rearranging blocks and adding functionality may be presented as if it were one or more simple arrays of blocks, or logical block devices. It is noted that a virtualized block device may also be referred to as a logical block device, and that in some embodiments, multiple layers of virtualization may be implemented. That is, one or more block devices may be mapped into a particular virtualized block device, which may be in turn mapped into still another virtualized block device, allowing complex storage functions to be implemented with simple block devices.

In various embodiments, block virtualization can support the creation of virtualized block devices implementing numerous different types of storage functions. For example, in one embodiment a virtualized block device may implement device striping, where data blocks may be distributed among multiple physical or logical block devices, and/or device spanning, in which multiple physical or logical block devices may be joined to appear as a single large logical block device. In some embodiments, virtualized block devices may provide mirroring, RAID5 and other forms of redundant data storage, the ability to create a frozen image (or snapshot) of a particular block device at a point in time, and/or the ability to replicate data blocks among storage systems connected through a network such as a local area network (LAN) or a wide area network (WAN), for example. In yet other embodiments, virtualized block devices may provide data change histories and data change maps. Additionally, in some embodiments virtualized block devices may implement certain performance optimizations, such as load distribution, for example, and/or various capabilities for online reorganization of virtual device structure, such as online data migration between devices. Block virtualization may provide any or all of these capabilities in a fashion transparent to virtualized block device consumers. That is, virtualized block devices may appear as generic storage devices to consumers such as file systems and applications.

Generally speaking, a volume 105 (which may also be referred to herein as a logical volume) may comprise a virtualized block device that may be presented directly for use by a block device consumer, i.e., a file system or an application (such as a database application, for example) that can directly use block devices. A given volume 105 may be associated with several logical or physical block devices as a result of the block device virtualization just described. Each block device included in the logical organization of a given volume or virtualized block device may be referred to as a storage object or logical storage object. As noted previously, a given virtualized block device may include multiple layers of virtualization, depicted in FIG. 1 as a tree of storage objects.

Volume server 135 (which may also be referred to herein as a virtualization coordinator or a volume coordinator) may provide functions such as configuration management of virtualized block devices and distributed coordination of block device virtualization. In one embodiment, for example, volume server 135 may be aware of the type and quantity of physical storage devices, such as block devices 104, that are available within system 100. In response to a request to configure a virtual block device, e.g., according to a desired set of virtualization features, volume server 135 may be configured to build a volume description that describes how a collection of storage objects compliant with the desired features maps to underlying physical block devices. The volume description identifying a particular volume 105 may be distributed to one or more volume clients 136. In one embodiment, such a volume description may be a tree of storage objects as illustrated in FIG. 1 and described in greater detail below in conjunction with the description of FIG. 2.

The structure of the volume 105, e.g., as indicated by its corresponding storage object tree, may indicate to a given volume client 136 how the volume relates to one or more underlying physical storage devices. In one embodiment, the leaf nodes of such a tree may correspond to one or more physical block devices such as block devices 104, and the root node of such a tree may be a logical block device through which the volume is accessed by a consumer. Distribution of a virtualized block device as a volume to one or more clients may also be referred to as distributed block virtualization. In some embodiments, after volume server 135 has distributed a volume description of a given virtual block device to a given volume client 136 as a particular volume 105, the given volume client 136 may interact with that particular volume 105 to read and write blocks without further involvement on the part of volume server 135. That is, the given volume client 136 may use the structure of the particular volume 105 to transform I/O requests generated by various consumers of that volume 105 into I/O requests directed to specific physical storage devices, such as block devices 104.

In the illustrated embodiment, volume server 135 reads and updates configuration information corresponding to volume descriptions (such as a storage object tree corresponding to a given volume) from a configuration database 106. In one embodiment, at least part of the functionality of the configuration database 106 may be provided by a metadata database, and at least part of the functionality of the volume server 135 may be provided by a metadata server. The configuration information in the database 106 establishes the logical configuration of data on the physical storage devices 104 (e.g., block devices 104A, 104B, and 104C). For example, such configuration information may indicate how various logical and physical block devices are divided, striped, mirrored, etc. In one embodiment, the configuration information may be stored on the devices (e.g., block devices 104A, 104B, and 104C) that are being virtualized. It is contemplated that in some embodiments, configuration of a given virtualized block device may be managed and/or stored in data structures other than trees of objects. For example, in one embodiment, tables may be used to map virtual block devices to physical storage.

As noted above, the configuration associated with a virtual block device may change over time, such as to add or remove mirrors; migrate data to new storage; increase or decrease the size of the device; create, manipulate, or remove snapshots; add structure for a new capability; etc. In some embodiments, if the volume description of a given volume 105 is distributed to more than one volume client 136, any changes that affect the structure of the given volume 105 may need to be coherently coordinated among the relevant volume clients 136. In one embodiment, volume server 135 may be configured to coordinate such changes. For example, volume server 135 may be configured to coordinate quiescence of those volume clients 136 to which the given volume 105 is distributed, in order to temporarily suspend activity to given volume 105. Volume server 135 may further distribute changes to the structure of given volume 105 to relevant volume clients 136 in an effectively atomic fashion, such that either all or none of the relevant volume clients 136 receive the changes.

As described in greater detail below in conjunction with the descriptions of FIGS. 15-18, volume clients 136 may be any type of device capable of interacting with a given volume 105 for data storage and retrieval. For example, in one embodiment a volume client 136 may be a server computer system, including one or more processors and one or more system memories, where the server system is configured to execute software such as one or more operating systems and/or applications. In another embodiment, a volume client 136 may be a client computer system configured to access a given volume 105 via a separate server computer system. In other embodiments, a volume client 136 may be an embedded system configured to use application specific integrated circuit (ASIC) or field-programmable gate array (FPGA) technology to execute operations whereby a given volume 105 may be accessed. Numerous other configurations of volume clients 136 are possible and contemplated. Additionally, as described in greater detail below, in some embodiments it is contemplated that the function of volume server 135 may be implemented via one or more of volume clients 136, whereas in other embodiments volume server 135 may be implemented via hardware distinct from volume clients 136.

In some embodiments of system 100, volume server 135 may be configured to distribute all virtualized block devices as volumes 105 to each volume client 136 within the system. Such embodiments may be referred to as symmetric distributed block virtualization systems. In some instances, however, symmetric distributed block virtualization may be difficult to implement or may negatively impact system performance. Generally, implementing uniform access to a set of physical devices as required for symmetric virtualization may result in excessively interconnected devices, which may add a burden to the configuration of storage devices, may increase the administrative burden of ensuring interconnectivity, and may reduce security in that more systems than require access to storage devices may be given access to storage devices. For example, in typical volume clients 136, operating system resources (e.g., data structures such as pointers or device handles) are allocated to the management and control of each volume 105 presented to the client for use. In very large-scale systems with many volume clients 136 and volumes 105, distributing each volume to each client may deplete the operating system resources dedicated to volume management and may increase the complexity of performing I/O accesses to volumes in general. For example, having a large number of volumes present may require the operating system to index large tables of volume-specific information for each I/O access that occurs. Further, in some embodiments of system 100, volume clients 136 may have heterogeneous functions such that a given client may access some volumes 105 more frequently than others. For example, some of volume clients 136 may be application servers configured to perform distinct functions requiring access to different types of data.

In the illustrated embodiment, volume server 135 is configured to distribute different sets of volumes 105 to different volume clients 136. That is, volume 105A is distributed to volume client 136A, volume 105B is distributed to volume client 136B, and volume 105C is distributed to volume client 136C. Generally speaking, systems in which subsets of the volumes 105 defined by volume server 135 are distributed to volume clients 136, and in which two or more subsets are at least partially nonoverlapping (i.e., in which at least one volume 105 is not common to two or more volume clients 136) may be referred to as asymmetric distributed block virtualization systems. (It is noted that distributed block virtualization systems also may be considered asymmetric in terms of how the virtualization is controlled. That is, in a system that is asymmetric in the control sense, the management of block virtualization that is performed by volume server 135 may be distinctly separated from input/output (I/O) activity to the virtualized block devices, such as performed by volume clients 136. For example, volume server 135 may be a completely separate system from volume clients 136 as illustrated in FIG. 1. By contrast, in a system that is symmetric in the control sense, one of the client systems configured to perform I/O to a virtualized block device may also be configured to manage block virtualization on behalf of the other client systems.)

Figure 2:
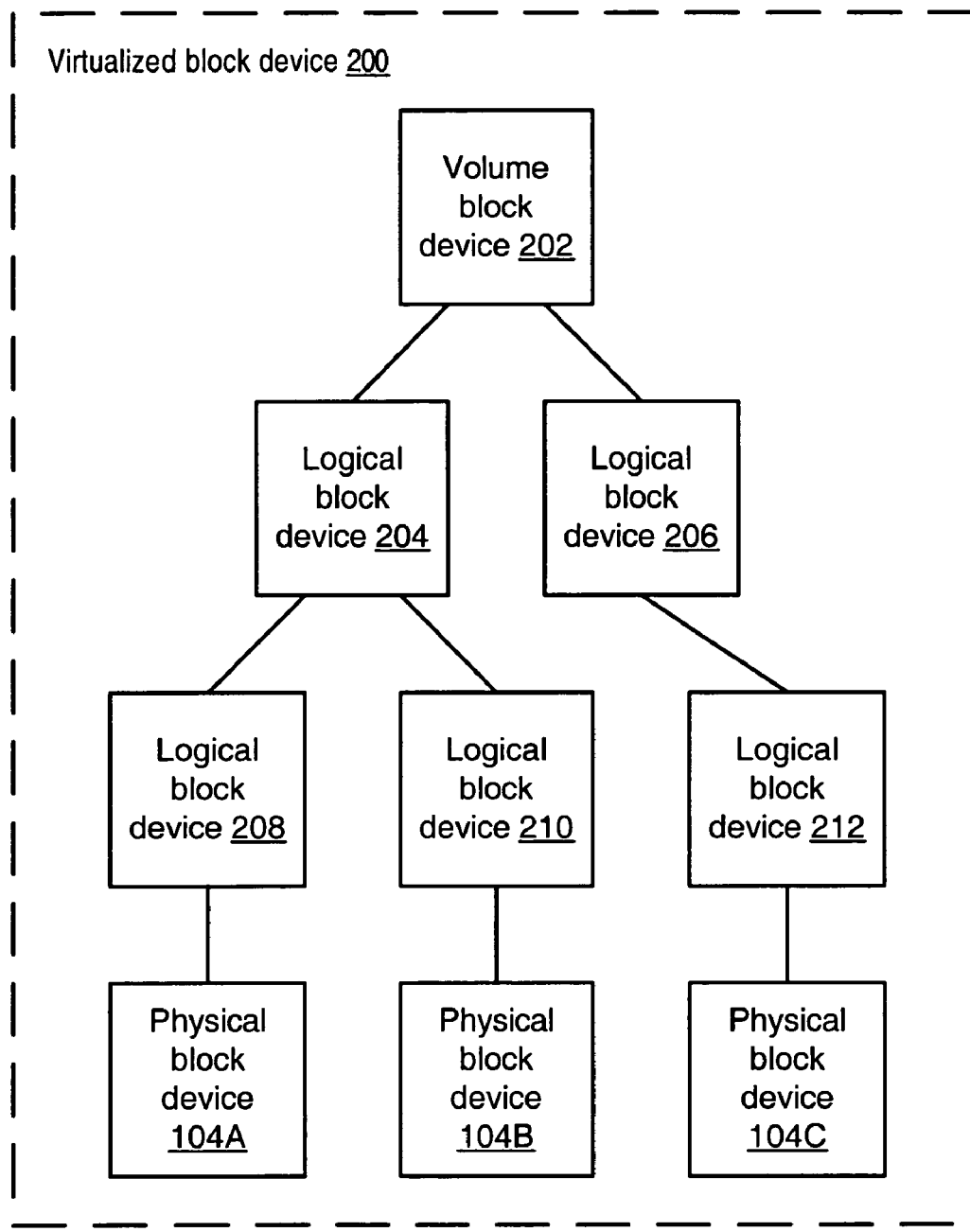
FIG. 2 is a block diagram illustrating one embodiment of a virtualized block device that may be presented as a volume.

One embodiment of a virtualized block device that may be presented as a volume 105 to a volume client 136 is illustrated in FIG. 2. In the illustrated embodiment, virtualized block device 200 includes a volume block device 202 that includes logical block devices 204 and 206. In turn, logical block device 204 includes logical block devices 208 and 210, while logical block device 206 includes logical block device 212. Logical block devices 208, 210, and 212 map to physical block devices 104A-C of FIG. 1, respectively.

Virtualized block device 200 may in its entirety represent the structure of the data comprising a given volume 105, which data may be physically stored in physical block devices 104A-C. Volume block device 202 may be configured to be mounted within a file system or presented to an application or other volume consumer as the interface through which the consumer may interact with given volume 105. Each block device that maps to or includes another block device may include an interface whereby the mapping or including block device may interact with the mapped or included device. For example, this interface may be a software interface whereby data and commands for block read and write operations is propagated from lower levels of the virtualization hierarchy to higher levels and vice versa.

Additionally, a given block device may be configured to map the logical block spaces of subordinate block devices into its logical block space in various ways in order to realize a particular virtualization function. For example, in one embodiment, virtualized block device 200 may be configured as a mirrored volume, in which a given data block written to virtualized storage device 200 is duplicated, and each of the multiple copies of the duplicated given data block are stored in respective block devices. In one such embodiment, volume block device 202 may be configured to receive an operation to write a data block from a consumer of corresponding volume 105. Volume block device 202 may duplicate the write operation and issue the write operation to both logical block devices 204 and 206, such that the block is written to both devices. In this context, logical block devices 204 and 206 may be referred to as mirror devices. In various embodiments, volume block device 202 may read a given data block stored in duplicate in logical block devices 204 and 206 by issuing a read operation to one mirror device or the other, for example by alternating devices or defaulting to a particular device. Alternatively, volume block device 202 may issue a read operation to multiple mirror devices and accept results from the fastest responder. Volume block device 202 may also issue multiple I/O commands to multiple underlying devices in a RAID5 environment, wherein additional data to be written may be determined based on data received by the volume block device 202.

As described above and shown in FIG. 2, in some embodiments a virtualized block device 200 may employ multiple layers of virtualization. For example, in the embodiment described above where logical block devices 204 and 206 function as mirror devices, it may be the case that underlying physical block devices 104A-C have dissimilar performance characteristics; specifically, devices 104A-B may be slower than device 104C.

In another aspect illustrating multiple layers of block virtualization, in one embodiment physical block device 104C may employ a different block size than logical block device 206. In such an embodiment, logical block device 212 may be configured to translate between the two physical block sizes and to map the logical block space define by logical block device 206 to the physical block space defined by physical block device 104C. In some instances, the logical block space of logical block device 212 need not be contiguously mapped to blocks of physical block device 104C; an arbitrary mapping may be used.

Numerous other possible configurations of block devices are contemplated that may incorporate more or fewer layers of virtualization to realize within a given instance of virtualized block device 200 virtualization functions similar to or different from those described above. For example, volume block device 202 may employ a greater number of mirror devices, striping may occur higher in the hierarchy than mirroring, certain logical block devices may be configured to perform snapshots of other devices, certain logical block devices may span multiple physical block devices, etc.

Multi-Layer Block Virtualization

Figure 3:
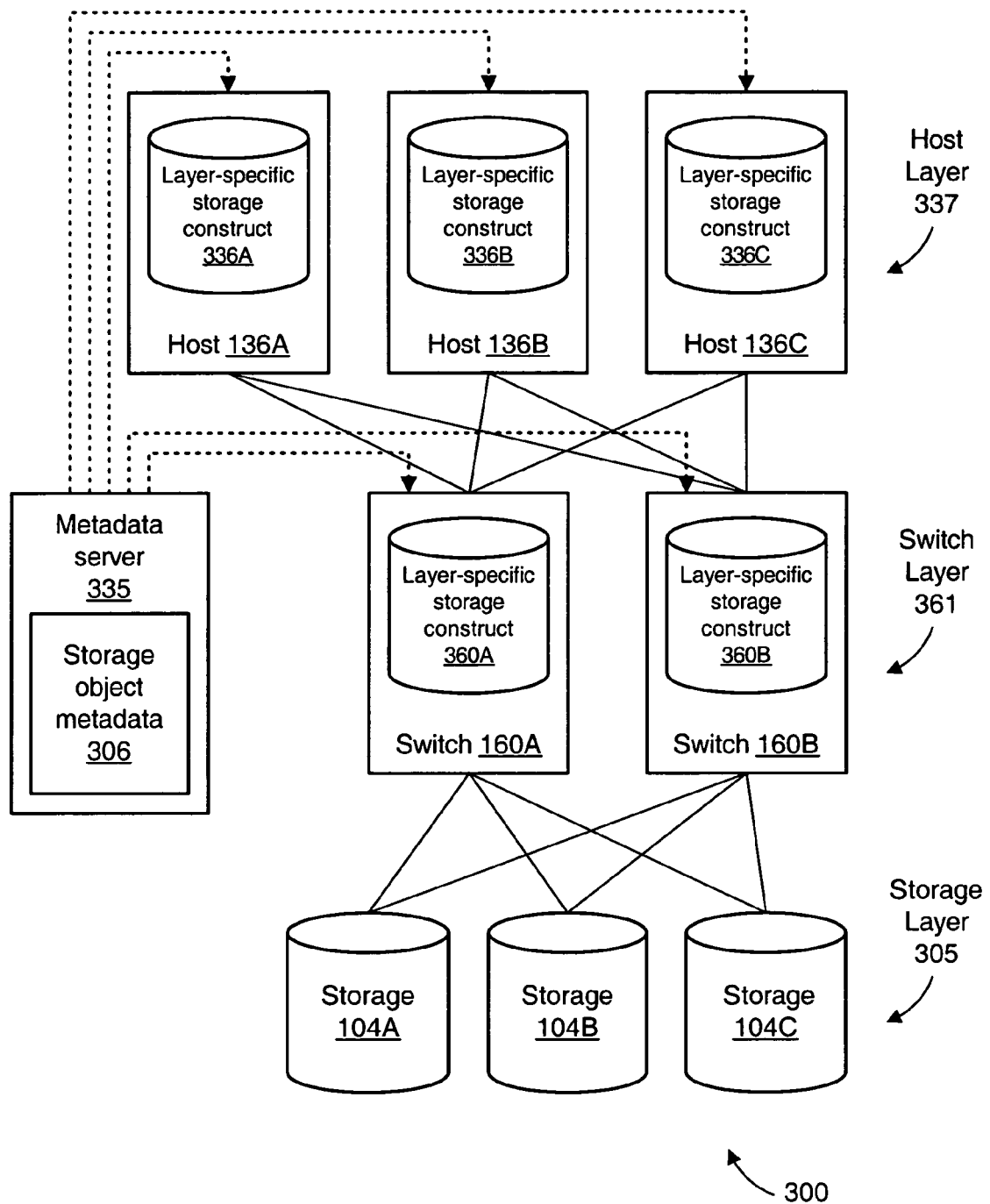
FIG. 3 is a block diagram illustrating an example of a computing system utilizing multi-layer virtualization according to one embodiment.

FIG. 3 illustrates an example of a computing system 300 utilizing multi-layer virtualization according to one embodiment. In various embodiments, block virtualization may be implemented at various layers in the storage environment: at an application host layer 337, at a fabric switch layer 361, at a storage appliance layer (not shown), at a storage device layer 305 (which may comprise, for example, disk array devices), and/or at other layers as may be deemed appropriate. A given virtualization layer may comprise one or more like storage entities which are configured to export virtualized storage. A given virtualization layer may also comprise one or more storage entities which are not configured to export virtualized storage. Although various embodiments described herein may use specific examples of multi-layer block virtualization architectures employing virtualization at particular combinations of layers, those skilled in the art will understand that other architectures may also be used with the storage techniques described herein. Exemplary computing system embodiments for implementing multi-layer block virtualization are described in greater detail below in conjunction with the descriptions of FIGS. 15-18.

In one embodiment, multi-layer virtualization may be coordinated by a metadata server 335. The metadata server 335 may be configured to manage metadata 306 for a plurality of storage objects and export that metadata 306 to various storage entities. In various embodiments, the metadata server 335 may be implemented as a single host or a set of cooperating hosts in parallel or serial clusters. In some embodiments, as noted above, part or all of the functionality of a volume server 135 may be provided by a metadata server 335. The metadata server 335 may be divided into a plurality of components, and each component may have an independent address space and may run on an independent set of hosts. In one embodiment, a separate metadata server may be used to configure each layer. The plurality of separate metadata servers may coordinate through direct communication between them or may coordinate indirectly through extensions to the I/O path protocols between storage components.

In one embodiment, storage objects are logical elements of storage which may be imported by storage entities and exported as layer-specific storage constructs. The term "import" refers to the process of obtaining the storage object metadata from the metadata server 335. Storage entities may include hosts, switches, appliances, storage arrays, and other suitable servers and edge devices which are configured to export storage. In the multi-layer virtualization environment shown in FIG. 3, a storage object may assume the personality (e.g., by providing the expected functionality and/or supporting the expected interfaces) of a layer-specific storage construct such as a logical volume, a storage volume, a virtual LUN, a device, etc. The particular type of layer-specific storage construct assumed by a storage object may depend on the position of the storage object in the object hierarchy and/or the characteristics of the layer of virtualization that imports the corresponding storage object.

Figure 4:
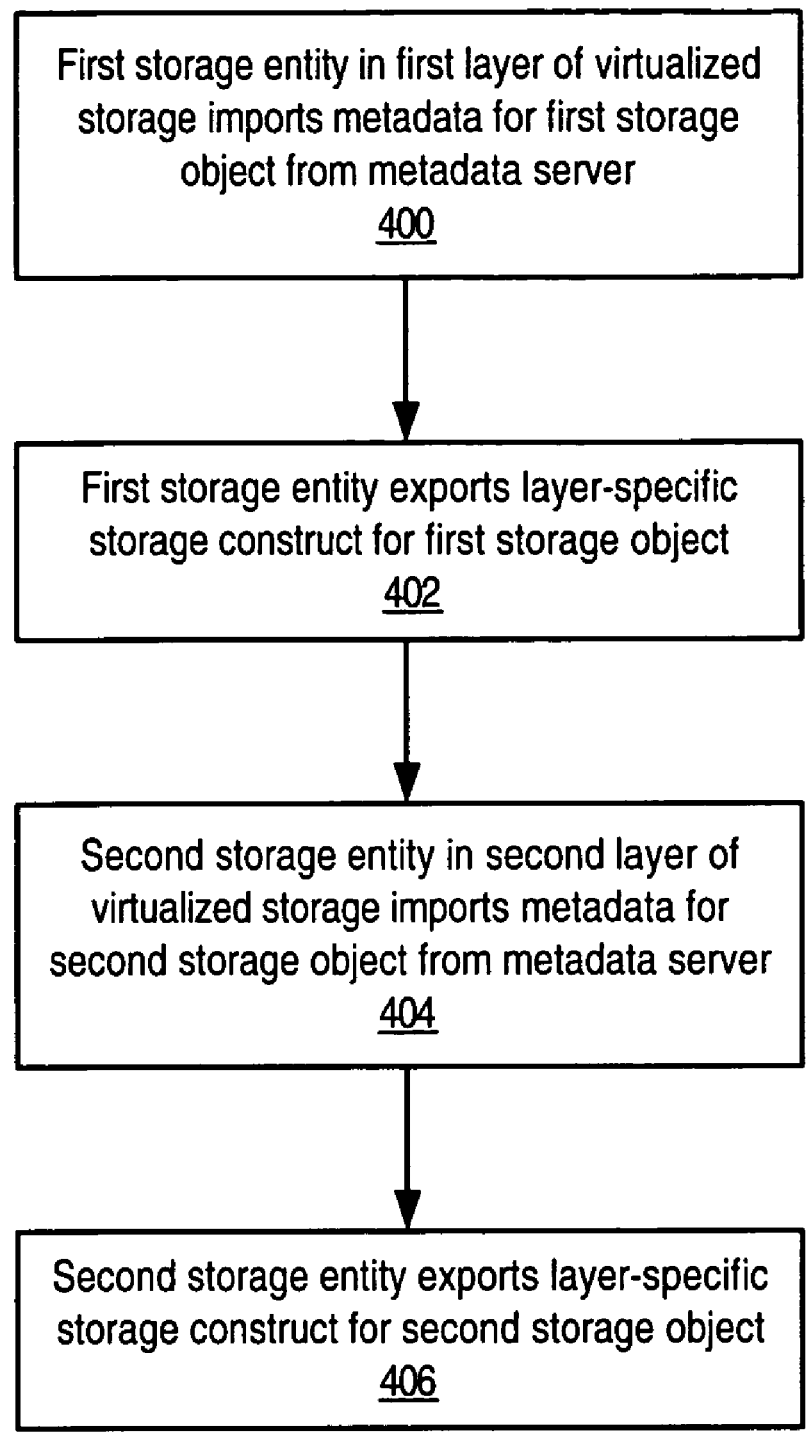
FIG. 4 is a flow diagram illustrating a method for provisioning storage in a multi-layer virtualization environment according to one embodiment.

FIG. 4 illustrates a method for provisioning storage in a multi-layer virtualization environment according to one embodiment. In 400, a first storage entity such as a host (e.g., host 136A, 136B, 136C) may import the metadata for a particular storage object from the metadata server 335. The layer-specific storage construct (e.g., layer-specific storage construct 336A, 336B, 336C) exported by the host in 402 may comprise a logical volume. The logical volume corresponds to the particular storage object whose metadata was imported by the host, and the host uses the metadata to export the appropriate layer-specific storage construct (i.e., the logical volume) for the storage object.

In 404, a storage entity in a second layer such as a switch (e.g., switch 160A, 160B) may import the metadata for a particular storage object from the metadata server 335. The layer-specific storage construct (e.g., layer-specific storage construct 360A, 360B) exported by the switch in 406 may comprise a virtual LUN. The virtual LUN corresponds to the particular storage object whose metadata was imported by the switch, and the switch uses the metadata to export the appropriate layer-specific storage construct (i.e., the virtual LUN) for the storage object.

A storage provisioning system may be used to create various storage objects in the multi-layer virtualization environment 300. In one embodiment, the allocation of storage objects may be on the physical disks (e.g., disks 104A, 104B, 104C) and/or existing storage objects. Each storage object may be associated with a unique identifier (UID) at the time of creation. The UID may be used by the storage entities to identify the storage object during communication with another storage entity or with the metadata server 335. The UID may comprise the world-wide name (WWN) for a virtual LUN that is exported by a switch. Each storage entity may also be identified by a UID which is assigned to it by the metadata server 335 when the storage entity registers with the metadata server 335. Mappings of UIDs for storage entities and mapping of UIDs for storage objects may be maintained by the metadata server 335.

In one embodiment, each storage object may comprise a tree-structured hierarchy of storage objects, some of them directly exported by a host and some by the layers underneath (e.g., switch and appliance). The configuration of storage objects in the multi-layer virtualization environment may be represented by a directed acyclic graph (DAG) in one embodiment. The storage object metadata 306 managed by the metadata server 335 may comprise the hierarchy of storage objects as well as other relevant configuration data for management of the storage objects. Import of a storage object by a storage entity may therefore comprise import of a hierarchy of storage objects.

The multi-layer virtualization environment 300 may use out-of-band virtualization in some embodiments. In out-of-band virtualization, the metadata is managed and maintained by the metadata server 335. During a metadata transaction, the storage entities using the storage objects involved in the transaction may be required to stop accessing those storage objects. For example, in one embodiment, a failure of one mirror of a logical volume may require that the failed mirror be replaced by a new mirror in order to continue to maintain the same level of redundancy. The metadata corresponding to the logical volume may be updated transactionally (e.g., in such a way that the changes can be rolled back if they do not succeed), and new I/O requests directed at the volume may be frozen until the transaction completes in some embodiments.

In one embodiment, the transport mechanism in the multi-layer virtualization environment 300 may be independent of operating systems, hardware, and network/fiber channel protocols. The storage entities and metadata server 335 may communicate through various network types such as LAN, SAN, or a combination thereof. Any two storage entities may be able to communicate with each other through this transport mechanism, independent of the layer at which they are operating and independent of the type of connectivity between them.

In another embodiment, the multi-layer virtualization environment 300 may include end-to-end secure I/O. The secure I/O may include client registration and authentication with the metadata server 335, an I/O rights grant from the metadata server 335 to the client, and layer-by-layer secure I/O on the storage objects using the rights grant. The I/O rights may be represented by a secure token, where the secure token may be created using keys for the relevant storage objects in the hierarchy.

I/O Path Failure Management

Figure 5:
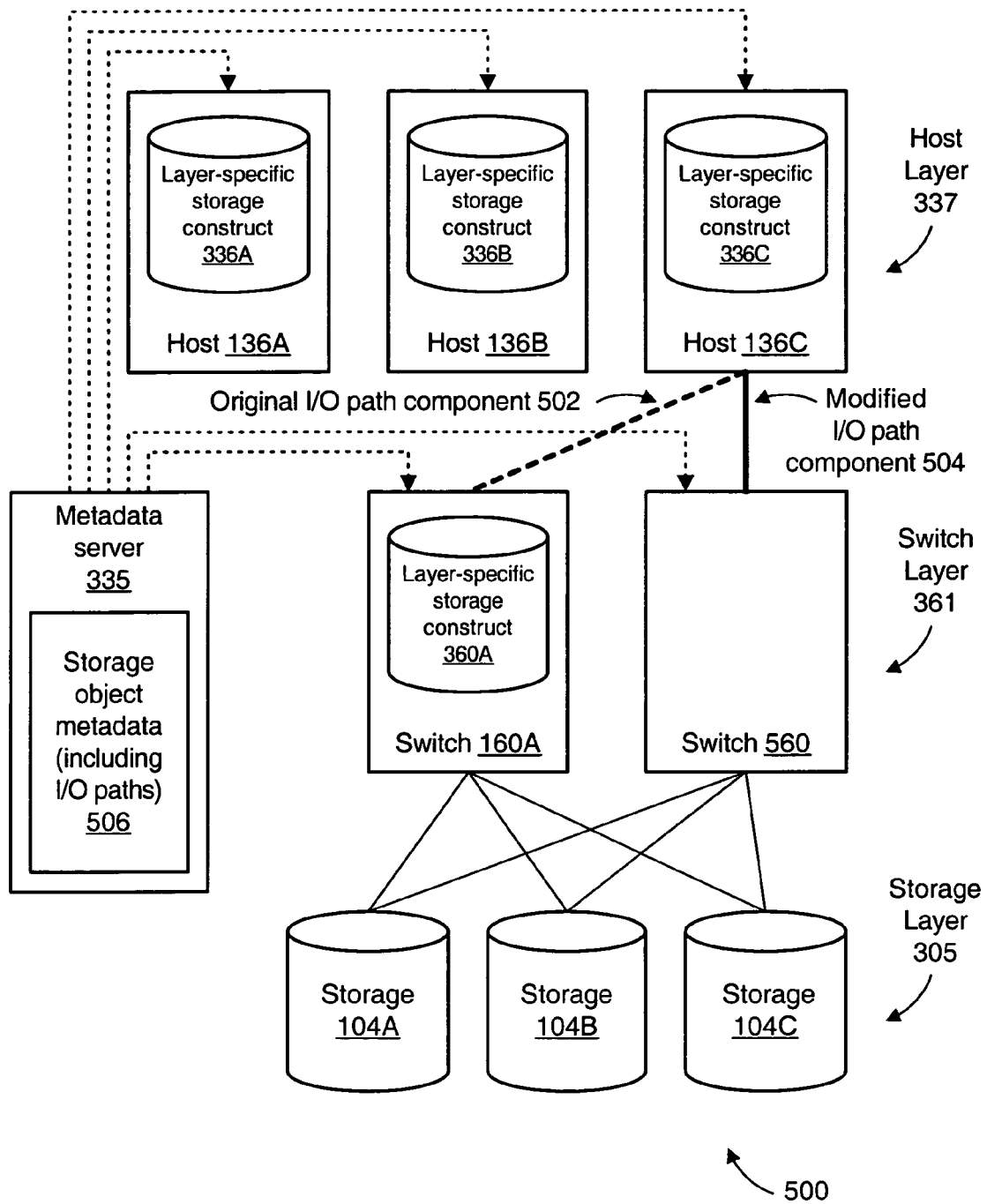
FIG. 5 is a block diagram illustrating an example of a multi-layer virtualization environment utilizing efficient I/O path failure management according to one embodiment.

FIG. 5 illustrates an example of a multi-layer virtualization environment 500 utilizing efficient I/O path failure management according to one embodiment. An I/O path comprises one or more communications linkages from a host or other consumer to storage (e.g., a physical block device). In many cases, an I/O path may comprise two main components: paths inside the fabric (e.g., switches and fabric network links between switches) and paths inside the storage devices (e.g., links between a storage array port and the internal disks inside the array). When I/O path failure policies do not distinguish between the two main components of a typical I/O path, they may make inaccurate assumptions about the source of a failure. For example, an I/O path failure policy of the prior art may incorrectly conclude that any storage failure is the result of a failure inside the storage array.

By maintaining the connectivity maps of I/O paths 506 in the metadata server 335, the multi-layer virtualization environment 500 may more accurately distinguish among the components of the I/O paths and more accurately locate sources of failure. In the example of FIG. 5, an I/O path from host 136C to storage (e.g., storage 104A, 104B, 104C) originally includes a link 502 from host 136C to switch 160A and virtual LUN 360A. A second switch 560 may be a "plain" switch that is not configured to export virtualized storage. If the link 502 to the "intelligent" (i.e., virtualization-capable) switch 160A fails, the connectivity map 506 may be analyzed to determine the source of the failure. If no redundant virtualized switch can be located, the host 136C may coordinate with the metadata server 335 to replace the missing functionality that was previously supplied by switch 160A.

The metadata server may generate a modified I/O path to bypass a failed storage entity (e.g., switch 160A) or failed layer of virtualized storage (e.g., switch layer 361) in the I/O path. The modified I/O path may include a new link 504 from the host 136C to another switch 560, provided that there is an available pathway from the second switch 560 to the storage. The modified I/O path may transfer I/O responsibilities of the failed storage entity or failed layer of virtualized storage to another storage entity (e.g., host 136C) or another layer of virtualized storage (e.g., the host layer 337). In taking on the I/O responsibilities of the failed switch 160A, the host 136C may import any additional storage objects as deemed necessary, or it may extend its management of an existing storage object down an appropriate number of levels in the hierarchy of the storage object.

Connectivity maps may be maintained by metadata server 335 using any suitable data structures, such as a graph in one embodiment. In some embodiments, metadata server 335 may be configured to refresh or regenerate its connectivity maps periodically and/or in response to events such as failure detections. For example, in one embodiment, before providing an alternate I/O path using its current connectivity map, metadata server 335 may be configured to ping or otherwise communicate with the storage entities of the alternate I/O path to determine their operational state and to update the connectivity map if needed.

Vertical Failover

Figure 6:
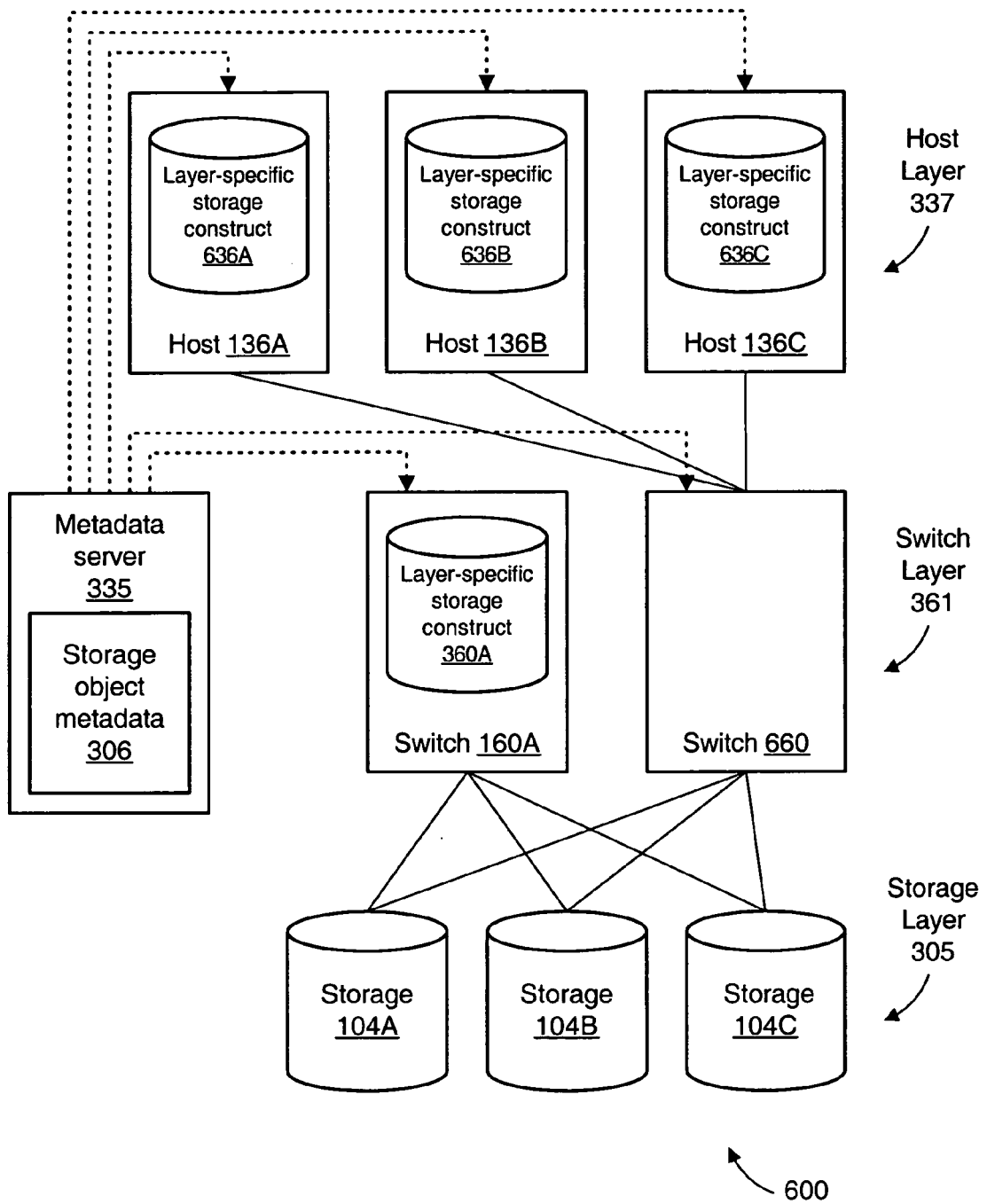
FIG. 6 is a block diagram illustrating an example of a multi-layer virtualization environment utilizing vertical failover according to one embodiment.

FIG. 6 illustrates an example of a multi-layer virtualization environment 600 utilizing vertical or inter-layer failover according to one embodiment. In a typical SAN environment, one or more "intelligent" fabric switches (e.g., switch 160A) may run virtualization software and export virtual LUNs (e.g., virtual LUN 360A). The remaining non-virtualized "plain" switches (e.g., switch 660) may export the physical devices. When a virtualization layer such as the switch layer 361 fails (i.e., when all the virtualized switches fail), an adaptive reconfiguration may permit an adjacent layer of virtualization to adopt the storage objects of the failed layer. Thus, the multi-layer virtualization environment 600 may facilitate vertical failover of storage objects. The vertical failover capability may mitigate a need to maintain a multitude of expensive intelligent switches in favor of less expensive plain switches.

For example, if the switch layer 361 fails to service I/O for the objects of that layer, then the host layer 337 may import the metadata for the storage objects previously managed by the adjacent switch layer 361. The host layer 337 may begin servicing I/O for those objects, provided non-virtualized switches (e.g., plain switch 660) can supply pathways from the host layer 337 to the underlying storage. As a result, the layer-specific storage constructs 636A, 636B, 636C exported by the host layer 337 may further comprise the storage objects corresponding to the virtual LUN 360A.

In one embodiment, adaptive reconfiguration may result in a reversal of the vertical failover if the failed virtualization layer is restored to service. For example, if the hosts 136A, 136B, 136C detect that the switch 160A is back in action, then the hosts may relinquish the storage object originally managed by the switch 160A. The switch 160A may continue to export the virtual LUN 360A as before the failure.

Vertical Coordination for Maintaining Data Consistency

Figure 7:
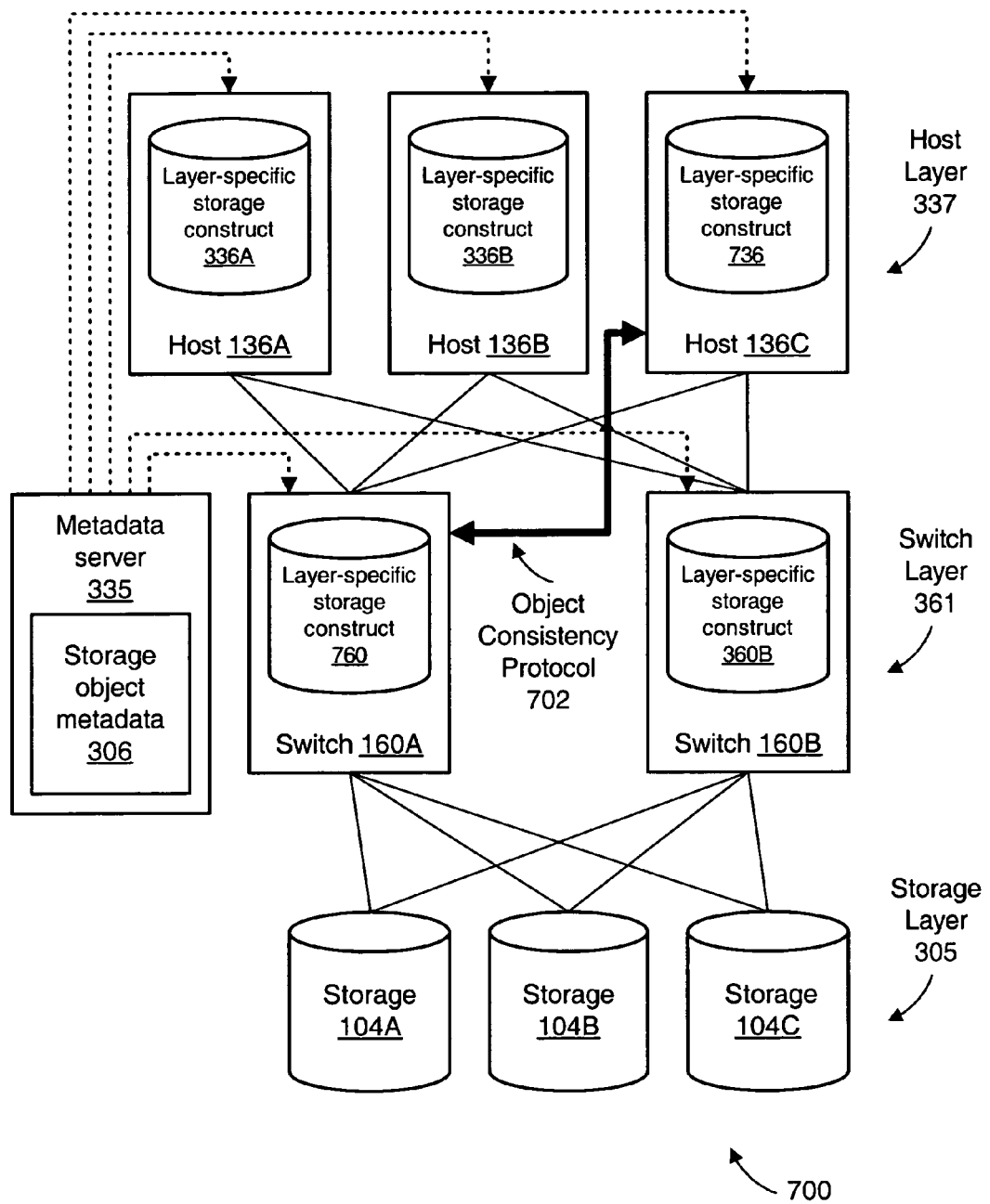
FIG. 7 is a block diagram illustrating an example of a multi-layer virtualization environment utilizing vertical coordination for maintaining data consistency of storage objects according to one embodiment.

FIG. 7 illustrates an example of a multi-layer virtualization environment 700 utilizing vertical coordination for maintaining data consistency of storage objects according to one embodiment. Because the metadata server 335 treats storage objects in a uniform manner, the same storage object may be imported by storage entities at different layers of virtualization. For example, a host 136C may import the metadata for a storage object and export a corresponding storage volume 736, while a switch 160A may import the metadata for the same storage object and export a corresponding virtual LUN 760. This capability may permit continuous I/O on the storage object if one of the storage entities fails.

In another exemplary multi-layer virtualization environment, a host layer may include two hosts 136A and 136B, each configured to access a particular volume via a respective intelligent switch 160A and 160B. Plain switches may also be available, providing alternate paths to the volume from the hosts. If switch 160A fails, host 136A may be configured to import the volume and access it via a plain switch; thus, both host 136A and intelligent switch 160B may export the same volume. In such a situation, host 136A may be configured to communicate with intelligent switch 160B, either directly or via an intermediary such as metadata server 335, to ensure that the exported volume is kept consistent (for example, if an additional mirror is added to the volume, both host 136A and intelligent switch 160B may be made aware of the additional mirror).

The storage entities which share access to the storage object may use an object consistency protocol 702 to maintain consistency of the storage object in some embodiments. Maintenance of data consistency may be critical if the storage object is subject to dirty region logging, in-flight i/o activity scoreboarding or other change tracking mechanisms, disconnected snapshot state updates, RAID5 parity synchronization, recovery, or other such functions. In one embodiment, the object consistency protocol 702 may be independent of operating systems, hardware, and network/fiber channel protocols. The storage entities may communicate using the object consistency protocol 702 through various network types such as LAN, SAN, or a combination thereof.

Vertical Delegation of Tasks

The multi-layer virtualization environment 300 may permit the vertical delegation of storage tasks in some embodiments. A storage entity at one virtualization layer (e.g., a host 136A at host layer 337) may delegate storage tasks such as the synchronization of mirrors, copy-on-write tasks, RAID-5 parity updates, logging, replication, and other suitable tasks to storage entities in other virtualization layers (e.g., a switch 160A at switch layer 361). Typically, tasks that are suitable for delegation may comprise tasks that are heavy consumers of CPU, memory, or network resources. The delegation may be coordinated through the metadata server 335. In one embodiment, the delegation between the virtualization layers may be implemented through in-band communication (e.g., using SCSI commands). In one embodiment, the delegation may use out-of-band communication (e.g., through a native protocol). In one embodiment, the tasks may be delegated on a per-I/O basis, statically configured with or without additional I/O parameters.

In one embodiment, a volume may be defined to a host. The underlying storage entity may be instructed (e.g., through configuration) to perform mirrored writes while the host correctly handles mirrored reads. Alternatively, the underlying storage entity may perform RAID-5 parity updates for writes while the host handles reads. For example, the computations required for RAID-5 parity updates may be performed at a switch or other lower-level entity instead of at the host. In another embodiment, the underlying storage entity may be instructed to perform interlocked mirror copy and/or synchronization operations, but reads and non-overlapping writes are performed by the host. In another embodiment, the underlying storage entity may maintain a copy-on-write snapshot for a volume, but reads and blocks that have already been copied may be handled by the host.

Efficient I/O Scheduling

Figure 8:
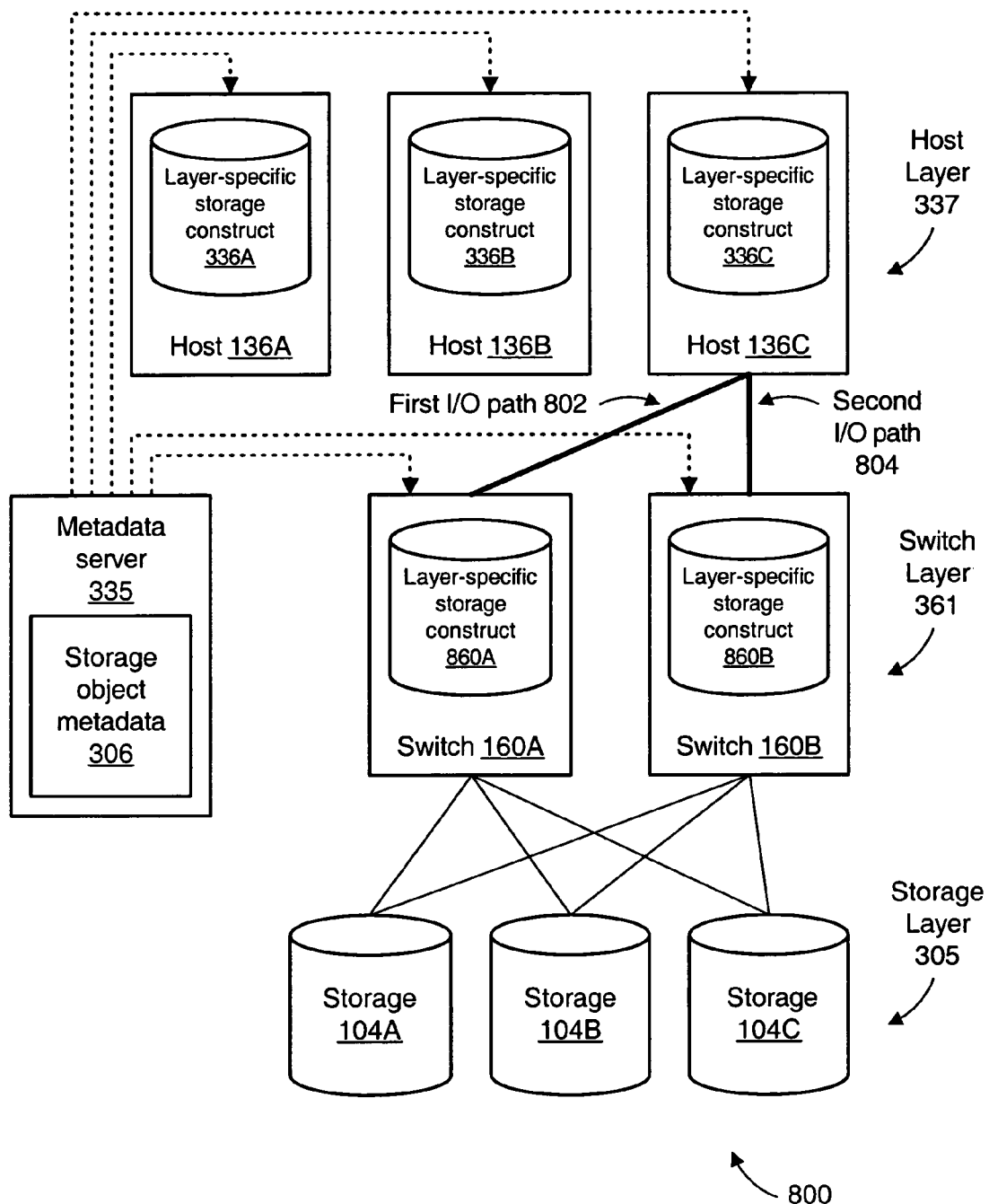
FIG. 8 is a block diagram illustrating an example of a multi-layer virtualization environment utilizing efficient multi-path I/O scheduling according to one embodiment.

FIG. 8 illustrates an example of a multi-layer virtualization environment 800 utilizing efficient multi-path I/O scheduling according to one embodiment. When multiple storage entities manage the same storage object (e.g., when switches 160A and 160B export virtual LUNs 860A and 860B corresponding to the same storage object), frequent communication may be used to maintain the consistency of the storage object. Situations such as snapshot state updates, dirty region logging map updates (in-flight i/o scoreboarding), RAID-5 parity rebuilds, mirror attaches and copies, and recovery interlocking may trigger a need for such communication between storage entities. This communication may result in undesirable network usage and latency.

In one embodiment, efficient scheduling of I/O may be used to minimize the communication needed to maintain the consistency of a shared storage object. For example, a host 136C may schedule I/O on a first portion (i.e., range) of the shared storage object through a first I/O path 802 to the first switch 160A, and the host 136C may schedule I/O on a second portion (i.e., range) of the shared storage object through a second I/O path 804 to the second switch 160B. By ensuring that the two switches 160A and 160B are responsible for I/O on distinct and separate portions of the shared storage object, the amount of inter-switch communication may be minimized.

In one embodiment, an in-band communication (e.g., SCSI command) or out-of-band communication may be used to exchange information about the appropriate range of address space in the shared storage object. The lower layer (e.g., the switch layer 361) may return the appropriate range based on the properties and attributes of the storage object it is exporting. For example, if virtual LUNs 860A and 860B (corresponding to the same storage object) have a copy-on-write snapshot, then the I/O may be scheduled such that no two I/Os are sent through different paths if they access the same unit of snapshot's metadata update. Therefore, the consumer of the shared storage object may schedule all the I/O on a range of blocks from 0 to X on one path 802 and all the I/O from blocks X+1 to 2X on another path 804.

The subdivision of address space may be implemented using a variety of techniques. For example, instead of dividing the address space into contiguous sub-ranges, a modulo-based technique (e.g., where two successive logical blocks are mapped to two successive partitions) may be used in one embodiment and a hash-based technique in another. In addition, the different partitions of address space may not be equal in size, and multiple partitions of address space may be assigned to the same I/O path. That is, an asymmetrical distribution of address space to I/O paths may be employed in such embodiments, e.g., so that I/O paths with more resources available for update coordination may be assigned relatively larger subsets of the address space.

In one embodiment, a plurality of storage entities (e.g., hosts 136A, 136B, 136C in a host layer 337) may be consumers of the shared storage object (e.g., virtual LUNs 860A and 860B). In such a scenario, the consumers of the shared storage object may cooperate to maintain the efficient I/O scheduling. For example, all the hosts may schedule I/O on a first range of the shared storage object through the first I/O path 802 to the first switch 160A, and the hosts may schedule I/O on a second range of the shared storage object through the second I/O path 804 to the second switch 160B.

Adaptive Logical Object Discovery Process

In one embodiment, the metadata server 335 may guide a storage entity (e.g., an application host) to discover various target storage objects in the multi-layer virtualization environment. Storage entities may need to discover storage objects in a variety of scenarios. For example, an application may desire to mount and use a volume for I/O access, or hosts may need to rediscover the appropriate storage objects after a failure in the multi-layer virtualization environment.

In one embodiment, object discovery may be a bottom-up process, where, for example, starting at the lowest layer of virtualization such as a storage device layer, successive layers may build up their knowledge of the storage objects that may be accessible to them. When a particular storage entity is started up or powered on, for example, it may be configured to establish communication with metadata server 335. Metadata server 335 may be configured to maintain a database on the storage environment, which may include such information as the applications to be supported in the storage environment, the specific mappings of applications to hosts and to storage objects such as logical volumes, mappings between different layers of storage objects, and security attributes of each storage object. Using the information maintained in its database, metadata server 335 may respond to the communication from the storage entity that has just started up, indicating to that storage entity the identifiers and locations of various storage objects that may need to be accessed by it. In addition, the metadata server may also provide the storage entity with a list of storage objects to be exported by the storage entity. A proprietary storage protocol may be used for the communication between the metadata server 335 and the storage entity. As higher-level storage entities are started up, metadata server 335 may be able to provide them with information on lower level entities that have previously been started up—for example, a switch may be provided information on appliances and/or disk array devices.

Discovery may also be initiated based on specific application requests in some embodiments, in addition to being initiated when storage entities are started up. When an application needs to mount a particular volume, for example, a request to the metadata server 335 may be sent from the host 136 where the application runs. The metadata server may look up information on the requested volume and determine that additional intermediate storage entities (e.g., switches) may have to be initialized or started up before the requested volume can be accessed.

In addition, discovery may be initiated upon a detection of a failure in some embodiments. For example, if a host 136 loses communication with a volume, the host may be configured to contact the metadata server 335 to determine if an alternate path to the volume exists. In turn, the metadata server 335 may be configured to examine its database and identify one or more alternate paths if such paths are available. The metadata server 335 may also be configured to communicate with one or more devices on the alternate paths, for example to ensure that the alternate paths are operational, prior to making the alternate path known to the host.

The discovery process may provide logical handles only for those storage entities that the requesting storage entity would like to use; other details may be hidden. The discovery process may return information such as an OS identity of the storage object. In one embodiment, the discovery process may be multipoint discovery. For example, any discovery at an application host layer 337 may automatically trigger discoveries at other layers such as a switch layer 361 or a storage controller layer 305.

Requirements supplied by the requesting source (e.g., an application host) may be used in the discovery process. The adaptive discovery process may dynamically adjust based on various parameters such as application requirements, availability of options for delegation of virtualization functions at various layers, and the type of failures in the environment. Such information may be maintained by the metadata server 335 at the time of creation of any storage object. Based on this information, the metadata server 335 may guide the process of discovery.

With multi-layer virtualization using a plurality of cooperative metadata servers, the cooperative metadata servers may communicate information regarding discovered and configured objects. As a result, upper layers may discover storage objects by coordinating with the metadata servers for lower layers rather than by direct discovery of the relevant storage objects at the lower layers.

Load Balancing Using Policy-Based Adaptive Delegation

In one embodiment, a policy-based adaptive delegation of virtualized I/O functions may be used to achieve load balancing. When excessive I/O traffic or other resource consumption is detected, a process of balancing I/O or resource consumption by using assisted switchover may be triggered. For example, if a fabric switch 160A that is exporting virtual LUNs gets overloaded, this condition may be detected as a violation of a policy establishing acceptable I/O load. Policies may be established throughout the multi-layer virtualization environment to maintain desired levels of response time. In response to detection of a policy violation, the metadata server 335 may arrange to move one or more of the virtualized LUNs from the switch 160A to one or more other storage entities. The identity of the other storage entities may depend on the presence of another intelligent switch in the fabric and its connectivity with the hosts accessing the virtual LUNs.

Figure 9:
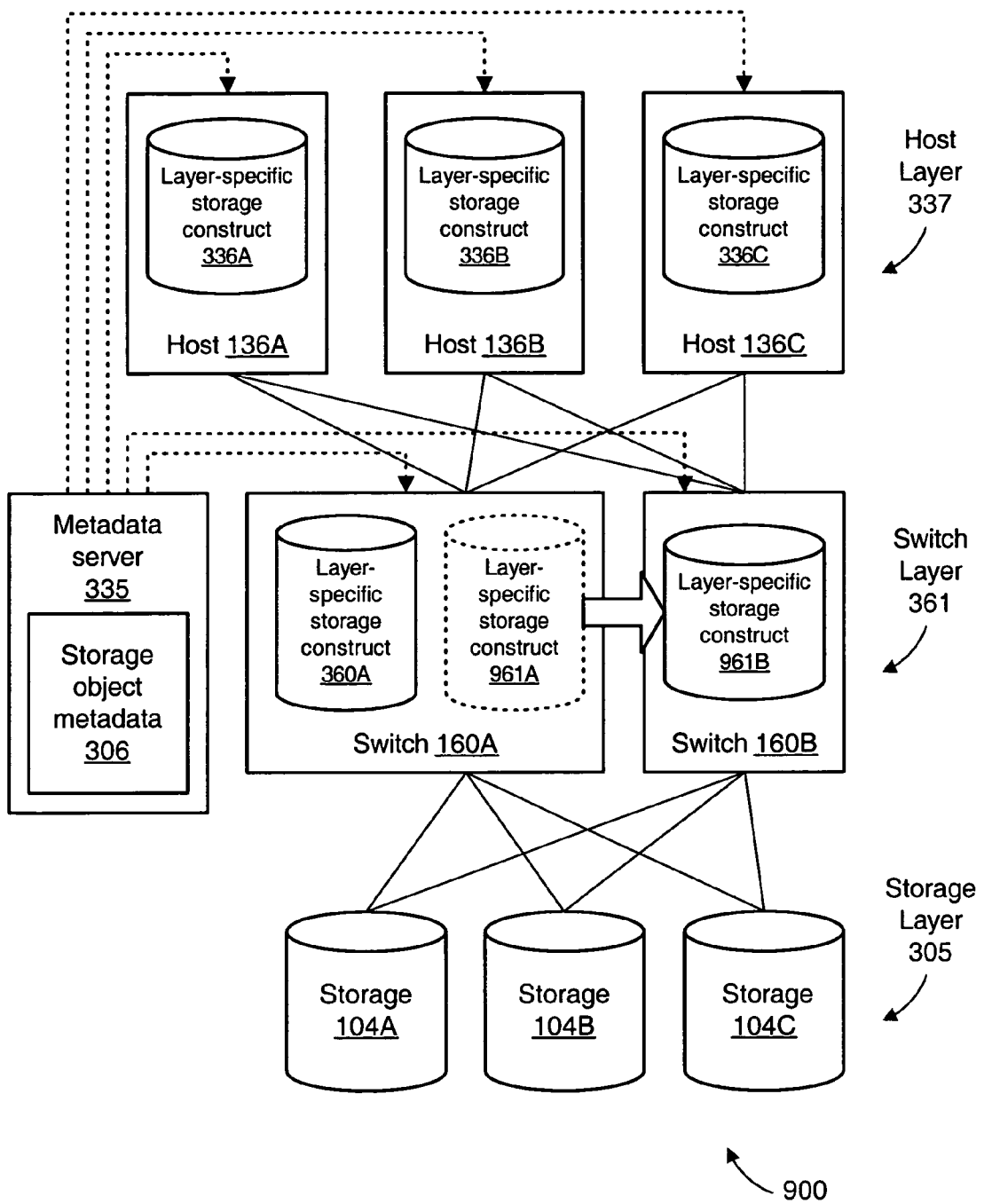
FIG. 9 is a block diagram illustrating an example of a multi-layer virtualization environment utilizing adaptive horizontal delegation according to one embodiment.

FIG. 9 illustrates an example of a multi-layer virtualization environment 900 utilizing adaptive horizontal delegation according to one embodiment. If another intelligent switch 160B is present in the fabric and has the same connectivity with the hosts and the storage, the metadata server may automatically direct the lightly loaded switch 160B to adopt one or more of the storage objects corresponding to a virtual LUN 961A from the overloaded switch 160A. The second switch 160B may then start exporting the virtual LUN 961B. The metadata server 335 may then direct the hosts or other consumers to use the new virtual LUN 961B through the new route. In this manner, adaptive delegation may balance the load across intelligent switches in the fabric.

Figure 10:
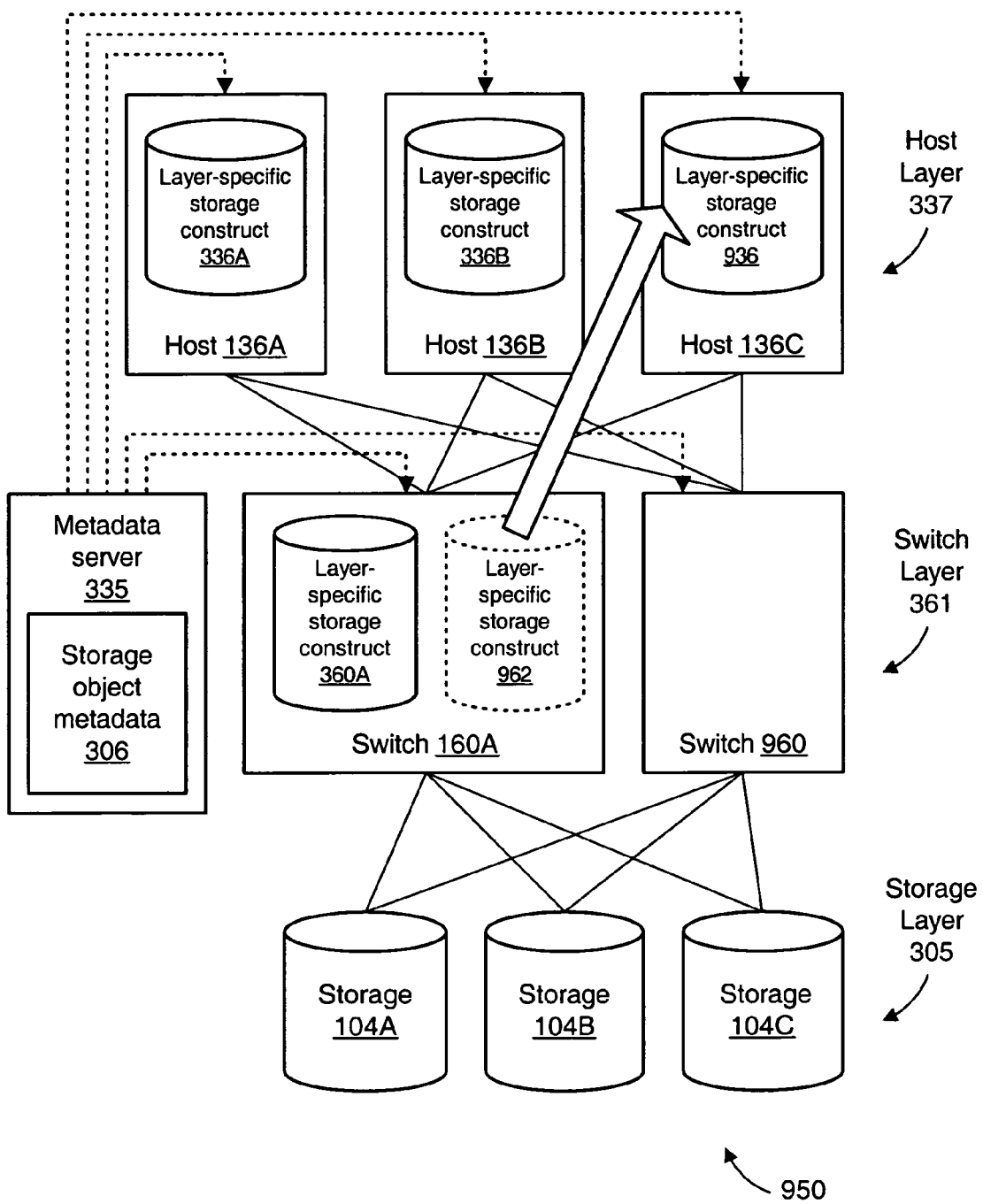
FIG. 10 is a block diagram illustrating an example of a multi-layer virtualization environment utilizing adaptive upward delegation according to one embodiment.

FIG. 10 illustrates an example of a multi-layer virtualization environment 950 utilizing adaptive upward delegation according to one embodiment. In this scenario, an alternate intelligent switch in the fabric may not be available or have the required connectivity with host and storage. As a result, the metadata server 335 may automatically direct one or more hosts themselves (e.g., host 136C) to adopt the storage objects corresponding to the virtual LUNs of the overloaded switch 160A. In the example shown in FIG. 10, the host 136C exports a layer-specific storage construct 936 (e.g., a logical volume) corresponding to the storage object originally exported by the switch 160A as a virtual LUN 962. In this example, a plain switch 960 is available to provide direct disk accesses to the host 136C. By performing upward delegation in this manner, the load on an intelligent switch 160A may be reduced.

In one embodiment, adaptive downward delegation may be utilized. In one scenario, for example, an alternate intelligent switch may become available after the use of adaptive upward delegation as illustrated in FIG. 10. In another scenario, the I/O load on the switch 160A may be low enough to permit the switch 160A to assume I/O responsibilities for additional storage objects. As a result, the metadata server 335 may automatically direct the switch 160A or the alternate intelligent switch to adopt storage objects that were previously delegated by the switch layer to the host layer. The switch 160A or the alternate intelligent switch may then export one or more layer-specific storage constructs (e.g., virtual LUNs) corresponding to the storage objects that were previously exported by the host layer as logical volumes. In this way, the load on the host layer may be reduced.

Replication

Traditionally, replication has been performed in a symmetric way, i.e., between homogeneous entities such as host-to-host and array-to-array. In symmetric replication, host-based replication solutions have replicated logical volumes, and replicators in appliance or hardware arrays have replica logical devices. In a multi-layer virtualization environment, coordination between layers may be used to achieve asymmetric replication, i.e., replication between heterogeneous entities and layers.

Figure 11:
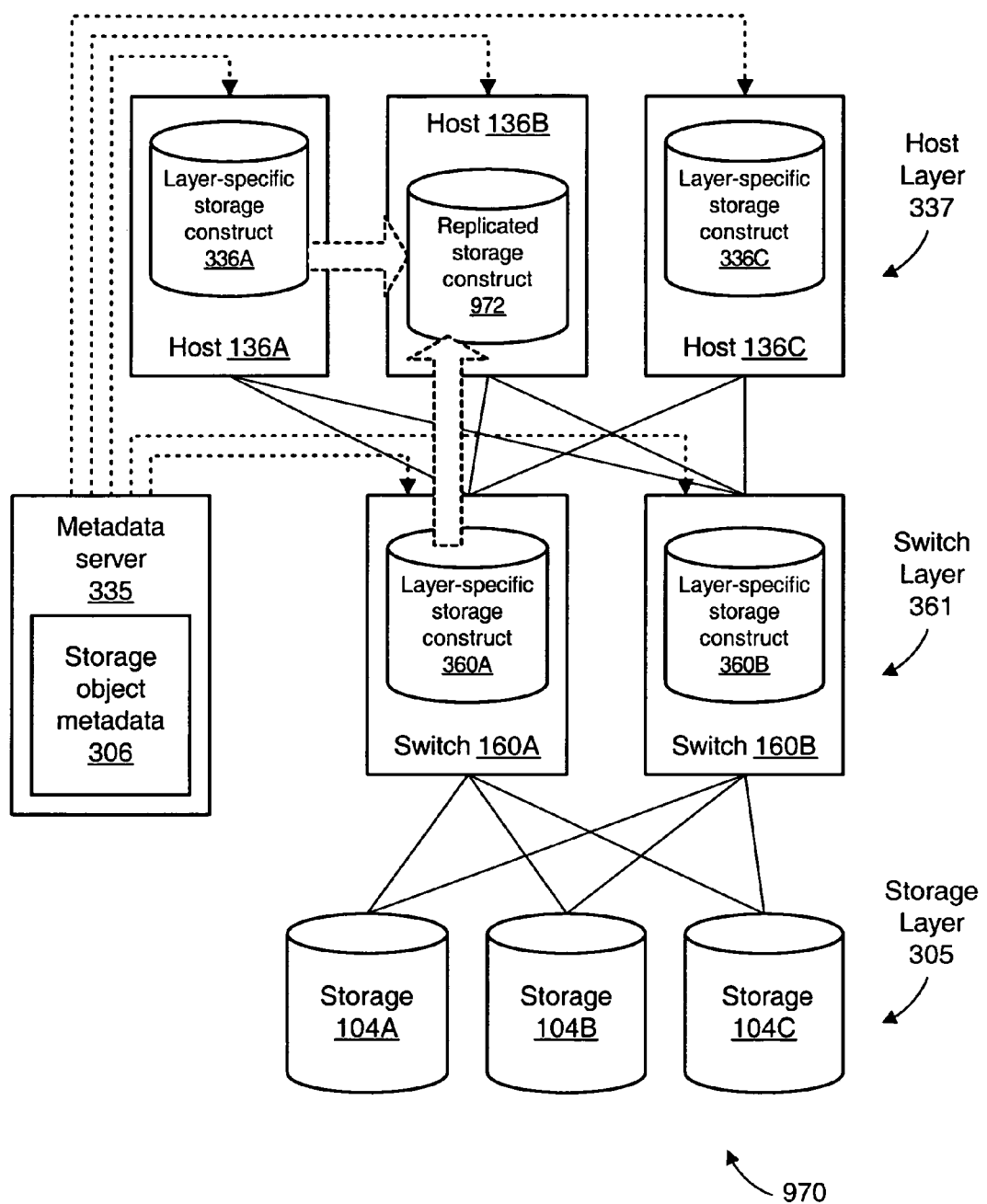
FIG. 11 is a block diagram illustrating an example of a multi-layer virtualization environment utilizing replication according to one embodiment.

FIG. 11 illustrates an example of a multi-layer virtualization environment 970 utilizing replication according to one embodiment. In one embodiment, volume 336A on the primary may be replicated as replicated storage construct 972 on the secondary. In one embodiment, virtual LUN 360A may be replicated at the host layer 337 as replicated storage construct 972. In various embodiments, replication may be done at layers other than the host layer 337. In various embodiments, a plurality of storage objects or a portion of one storage object may be replicated as a single replicated storage construct at the same layer or a different layer. Those skilled in the art will understand that such replication capabilities may enable many different combinations and relationships in a multi-layer virtualization environment.

In one embodiment, replication of host-defined storage objects (e.g., volumes directly used by a file system) may be coordinated with a target which is defined within a target storage network (e.g., a switch, appliance, disk array, or even a target metadata server operating outside the hosts themselves). In this way, data may be replicated to a remote facility without assigning a host to receive the replicated data. Because a host is not needed until a takeover occurs at the remote site, host systems at the target may be fully utilized for other purposes until such time as takeover is desired. Takeover may then comprise the host importing the necessary storage objects to allow access to the replica.

In one embodiment, the updates associated with maintaining a snapshot of a replica may be handled partially or entirely within a particular storage entity (e.g., a switch, appliance, disk array, etc.). In this embodiment, a host may cooperate with lower-level virtual components to provide access to the snapshot as a volume.

Cache Coordination

In some embodiments, multiple entities at one or more layers of a multi-layer virtualization environment may include read and/or write caches for storing data. A particular storage entity at one layer (which may be termed the requesting entity herein) may be configured to request caching operations at one or more other storage entities (which may be termed the requested entities herein) within the same virtualization layer or in a different layer. If the requesting and requested storage entities are in the same layer (e.g., if they are both hosts or both switches), the two storage entities may be said to participate in horizontal cache coordination. If the requesting and requested storage entities are in different virtualization layers (e.g., if the requesting entity is a host and the requested entity is a switch), the two storage entities may be said to participate in vertical cache coordination. A single storage entity may be configured to participate (either as a requesting entity, or as a requested entity, or as both a requesting and a requested entity) in both vertical and horizontal cache coordination in some embodiments.

Figure 12:
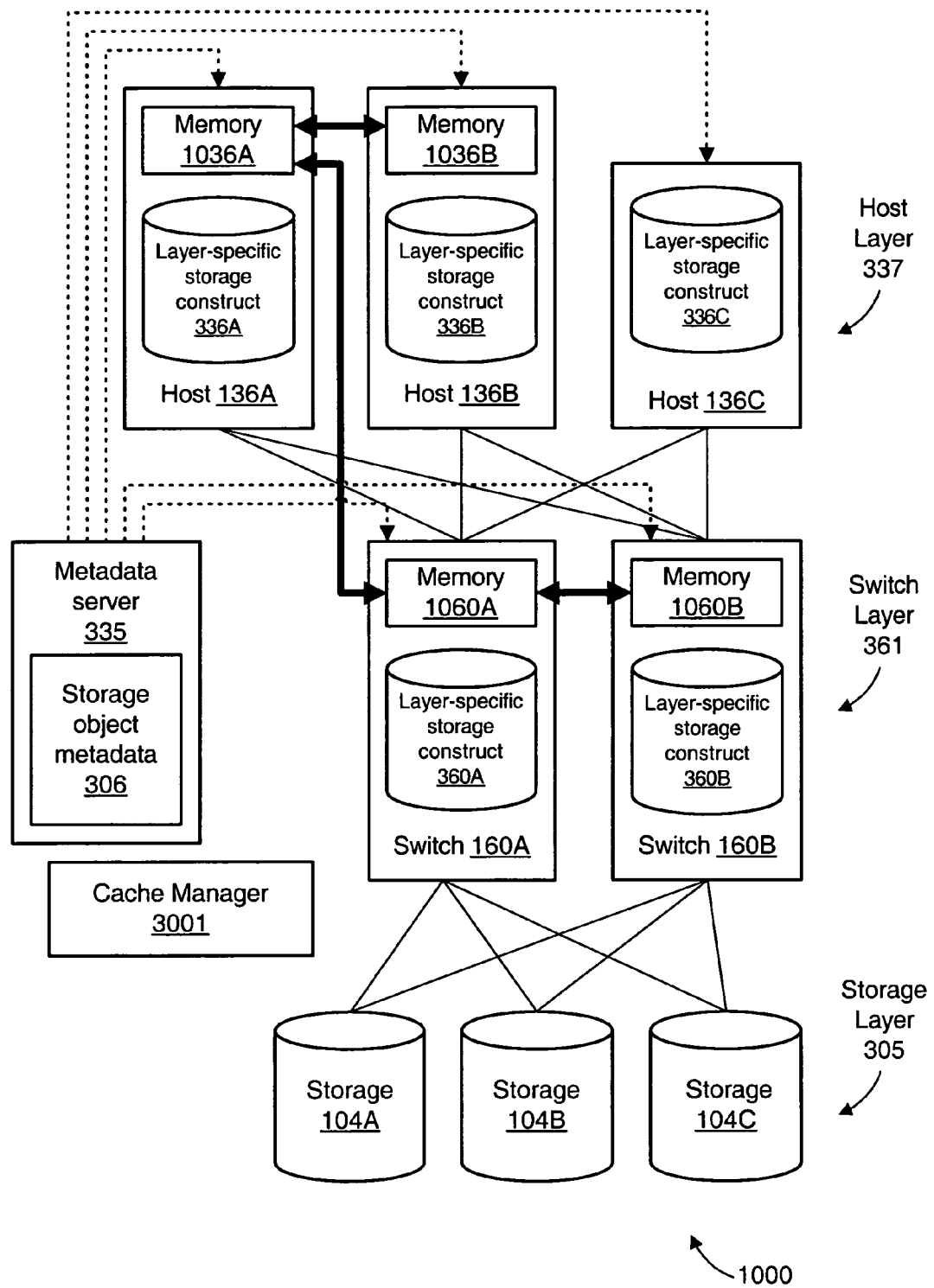
FIG. 12 is a block diagram illustrating an example of a multi-layer virtualization environment utilizing cache coordination according to one embodiment.

FIG. 12 illustrates an example multi-layer virtualization environment 1000 where horizontal and/or vertical cache coordination may be implemented, according to one embodiment. For example, hosts 136A and 136B may implement caches in memories 1036A and 1036B, respectively, and switches 160A and 160B may implement caches in memories 1060A and 1060B, respectively. In one example of horizontal cache coordination, host 136A may request or instruct host 136B to cache a specified set of data blocks and, after the data has been read in to memory 1036B, host 136A may access the cached data from memory 1036B. In one example of vertical cache coordination, host 136A may request or instruct switch 160A to cache a specified set of data blocks, and after the data has been read in to memory 1060A, host 136A may access the cached data from memory 1060A.

A number of considerations may be used by the requesting storage entity to determine if and when caching at another entity should be requested, and in identifying the specific entities where caching may be requested. In order to help storage entities determine the set of caching options available, in some embodiments a cache manager 3001 may be implemented that may be responsible for providing each potential requesting entity with information about the caching capabilities and/or current caching status and contents at other storage entities. A centralized cache manager 3001 may be implemented in some embodiments, while a distributed cache manager 3001 that includes a local component at each participating storage entity may be implemented in other embodiments. In some embodiments, decisions to participate in coordinated caching may be made based on known or estimated resource utilization levels at various storage entities and/or the interconnects between entities. For example, in FIG. 12, if host 136A is made aware that host 136B is relatively less busy (e.g., that the processors and/or memory at host 136B have a lower utilization level than host 136A), host 136A may request host 136B to cache data on its behalf. Requests to cache data may typically be sent asynchronously in advance of the time at which the data is to be read or manipulated by the requesting entity. If the requested data is read and cached at the requested entity prior to the time it is needed at the requesting entity, the latency of obtaining the cached data from the requested entity (e.g., host 136B) may be substantially less than the latency which may otherwise be required to read the data from underlying physical storage devices. Modern host interconnects (e.g., interconnects using Infiniband™) may support substantially shorter latencies for accessing data from another host than typical disk seek and rotational latencies, for example. Resource utilization level information may be provided to storage entities such as hosts 136 and switches 160 by the cache manager in some embodiments. In some embodiments, the cache manager may also be configured to inform requesting storage entities whether and where their requested data has been cached.

Figure 13B:
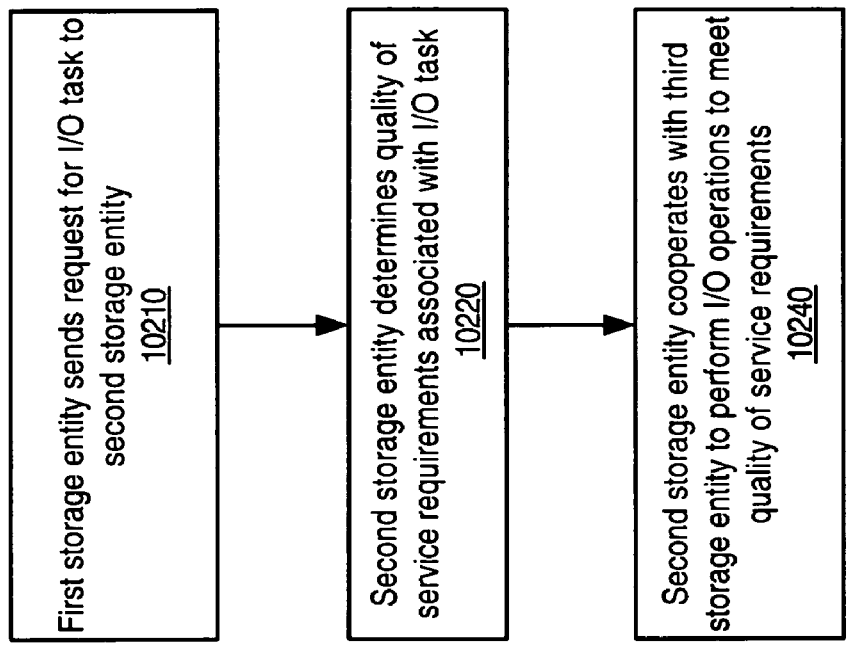
FIG. 13b is a flow diagram illustrating a method of multi-layer cooperation to achieve quality of service requirements for an I/O task, according to one embodiment.
Figure 13A:
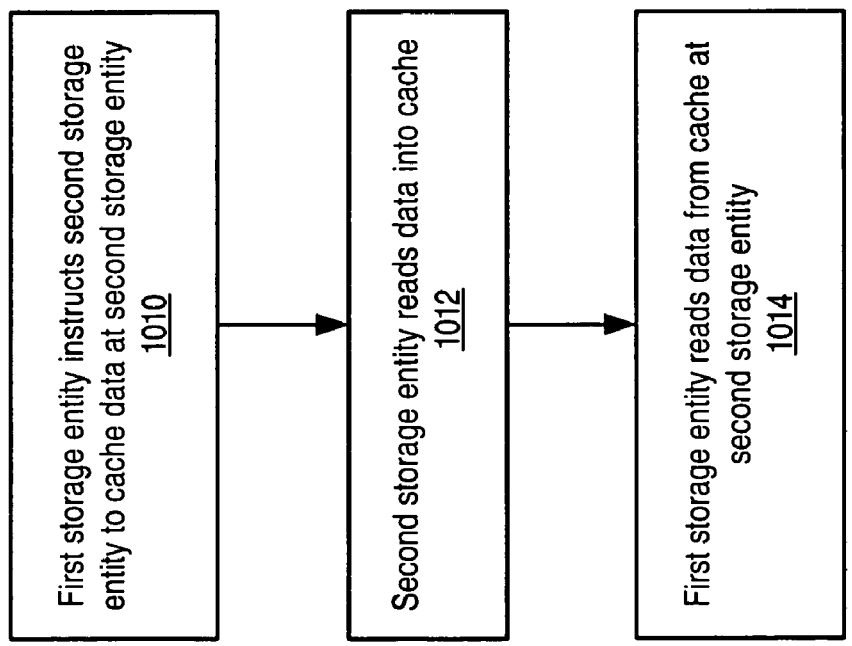
FIG. 13a is a flow diagram illustrating a method of cache coordination in a multi-layer virtualization environment according to one embodiment.

FIG. 13 illustrates a method of cache coordination in a multi-layer virtualization environment according to one embodiment. A first storage entity may instruct a second storage entity to store data in a cache at 1010, wherein the cache is managed by the second storage entity and readable by the first storage entity. The storage entities may be at the same layer or at different layers. The data may be read into the cache at 1012. At 1014, the first storage entity may read the data from the cache.

In one embodiment, the requesting storage entity may use any of a variety of cache controls and directives for cache coordination. In some embodiments, some types of caching requests, controls and/or directives may be advisory rather than mandatory, in that the requested storage entity may be configured to make a best effort to comply with the request, but may not be required to comply (e.g., based on current load conditions, the requested entity may explicitly or implicitly decline the request). The cache directives may specify specific time periods for which the data is to be retained in the requested entity's cache in some embodiments. In one embodiment, "do not cache" directives for reads and writes may be issued and passed to a storage entity—e.g, the requesting entity may wish to ensure that some specific data blocks are not cached. In one embodiment, directives for "sticky" caching may be issued. With sticky caching, a range of blocks may be guaranteed to be in a specific cache as long as the directive remains in effect—e.g., the range of blocks stored in the sticky cache is not discarded or replaced as long as the directive applies. In one embodiment, directives for cache migration may be used to remove data from a cache: i.e., the requesting entity may request that specified data blocks be invalidated or discarded from the requested entity's cache. Cache migration may be used for maintenance of a particular level of free cache space, load balancing, or other suitable purposes. In the case of horizontal cache coordination, an update to a block by one entity (such as host 136A) may require that other cached copies of the block (e.g., at host 136B) be invalidated, so that, for example, a stale version of the data block is not inadvertently provided from one of the entities that had previously cached the block. In some embodiments, a token-based write authorization protocol may be used to ensure that no more than one storage entity at a given layer of virtualization may concurrently update a block that may be cached at multiple entities.

In some embodiments, horizontal cache coordination may be performed at more than one layer of virtualization in parallel. For example, as noted above, host 136A may instruct or request host 136B to cache data in memory 1036B in the embodiment shown in FIG. 12. Host 136A may transfer the cached data from memory 1036B to memory 1036A. In a similar way, switch 160A may transfer data cached in memory 1060B to memory 1060A at the same virtualization layer 361. Horizontal cache coordination may be useful when one storage entity already has data that is needed by another storage entity. Horizontal cache coordination may also be useful when one storage entity is in a better position to retrieve data than another storage entity (e.g., because the requested entity has a more efficient path to the data, or because the requested entity is less lightly loaded).

Vertical cache coordination may also be performed by several sets of storage entities in parallel in some embodiments: for example, host 136A and switch 160A may participate in vertical cache coordination at the same time that host 136B and switch 160B are participating in vertical cache coordination. In vertical cache coordination, the storage entity in the upper layer may instruct the storage entity in the lower layer to pre-fetch data that may be required later, keep particular data in the cache for a period of time, or maintain in the cache information that is specific to the storage entity in the upper layer.

In another embodiment, a particular region of storage may be cached at only one layer in an I/O path. For example, an I/O path from a particular host to a storage object at a storage appliance may include a switch, and all three storage entities (the host, the switch and the storage appliance) may be capable of caching the data of the storage object. Caching the same data at multiple layers may not provide an optimum utilization of the caching capabilities of the various layers. Coordination between the layers may be employed so that a particular layer can free up the cache entries if another layer already has the same data cached. In the example of the host, the switch and the disk array, the host may initially request that the object be cached at the storage appliance. If the host later requests the switch to cache the object, the disk array and the storage appliance may be configured to cooperate to ensure that the object is only cached at one layer on the I/O path (e.g., the storage appliance may be configured to stop caching the storage object and/or invalidate its cached copy of the storage object).

In one embodiment, the path in which the region is cached may always be used to schedule the I/O. Such a technique may minimize or altogether avoid the problem of cache ping-pong, where, for example, a particular data block in high demand is moved from cache to cache as it is requested by different storage entities in different I/O paths. In one embodiment, the information about the I/O scheduled on a particular path may be maintained for a period time by a multipathing module of the storage objects so that future I/Os are not scheduled on alternate path until the data is cached at the next layer.

If a storage object at one layer is mirrored across the entities in the next layer, both the entities may cache the data in a redundant manner. The layers may cooperate so that one entity can be made a preferred destination for reads and the second entity can be asked not to keep that data in its cache. The preferred destination can be established per region of the storage object instead of the entire storage object.

In one embodiment, a set of upper-layer storage entities (e.g., hosts) may be configured to go through a read cache at a lower layer (e.g., the switch layer) for accessing particular blocks. If there is a change that causes I/O traffic to flow through a different path, such as a path or device failure behind the switch or a change to improve load balancing, the read cache may be purged. Such cache purges (which may also be initiated using cache directives or controls) may be implemented to ensure that a subsequent change to revert the traffic back to the original I/O path does not result in using stale cached data. Furthermore, in an embodiment where an upper-layer storage entity is configured to write preferentially to a particular underlying device, the upper-layer entity may initiate a cache purge or cache disabling if it is forced to switch to an alternate I/O path due to problems that it encounters using the preferred path.

Application-Assisted Read-Ahead

Many applications (e.g., databases and file systems) may be capable of identifying data that is likely to be accessed or required in the near future. The identification may be performed, for example, using application-specific heuristics and/or by predicting a set of data blocks likely to be accessed based on a past sequence of data accesses. Often, it may not be desirable to keep a large amount of data in the memory on the host, where memory may be at a premium. With application-assisted read-ahead, data that is likely to be required by an application may be cached by another storage entity. Application-assisted read-ahead may be desirable to permit a lower-layer storage entity (e.g., a disk array) to use spare cycles to perform requested read-ahead operations. Application-assisted read-ahead may also take advantage of opportunities presented by the manner in which the disk read head passes across the surface of the disk to read certain blocks with little overhead, for example by avoiding disk seek operations.

In one embodiment, a storage entity may identify a region of storage comprising data that is likely to be required by that storage entity, or use a record of earlier accesses to identify one or more specific data blocks that may be accessed in the near future. For example, if blocks at offsets N, N+1 and N+2 of a particular volume have been accessed, the storage entity may predict that blocks at offsets N+3, N+4 etc. are likely to be accessed soon. Patterns that include gaps may also be used for predictions: e.g., if blocks at offsets N, N+2 and N+4 have been accessed, a prediction that blocks at offsets N+6, N+8, etc. may soon be accesses may be made. The storage entity may instruct or request a second storage entity to store the data in the cache of the second storage entity by pre-fetching the data from the region of storage. Application-assisted read-ahead may be performed in a horizontal manner (i.e., between storage entities at the same virtualization layer) or vertical manner (i.e., between storage entities at different virtualization layers).

For example, after identifying one or more regions of storage to be pre-read, an application may instruct the host layer 337 to pre-cache those regions. The regions of storage to be pre-fetched may be identified by system components (such as file systems or volume managers) in some embodiments, and/or by user-level applications (such as database systems) in other embodiments. For example, a database application may be configured to perform query optimizations which, in some cases, may lead to the identification of specific data blocks that may be needed at a later stage of query execution. A prefetch of such specific data blocks may help to speed up query execution. The host layer 337 may then instruct the switch layer 361 to read those regions and keep them in a cache memory (e.g., NVRAM). When the data is actually required by the application, the read request issued by the application may be satisfied through the data cached at the switch layer 361, thereby avoiding the latency of accessing a disk. In some embodiments, lower layer storage entities such as switches may be configured to automatically detect data access patterns of higher-level storage entities such as hosts, and automatically initiate prefetching of data based on predicted data access requests of the higher-level entities. A number of different interfaces (which may be similar to the cache directives or controls discussed above) may be used to request pre-fetches in various embodiments. For example, user-level applications may specify their prefetch requests using system calls (e.g., ioctl( ) calls), which may in turn be converted to out-of-band commands storage protocol commands (such as some types of SCSI-3 commands) and sent to switches or to storage devices.

In one embodiment, a list of desirable or useful pre-read blocks may be generated at a particular storage entity and may be communicated to a second storage entity at the same layer of virtualization or at a different layer. The second storage entity may schedule reads of those blocks if it is convenient and/or cheap to do so. However, the second storage entity may ignore the request under certain conditions. In some embodiments, in response to a request to prefetch blocks, the second storage entity may be configured to make a determination as to whether the prefetch operation should be performed based on one or more factors, such as a current load level (e.g., a processing, memory or storage load level) at the second storage entity or an estimated expense of the prefetch operation. In other embodiments, the second storage entity that performs the prefetch operations may be configured to transfer the data to the requesting storage entity after it is prefetched, instead of, or in addition to, storing the prefetched data at the second storage entity.

Quality of Service for I/O

Figure 14:
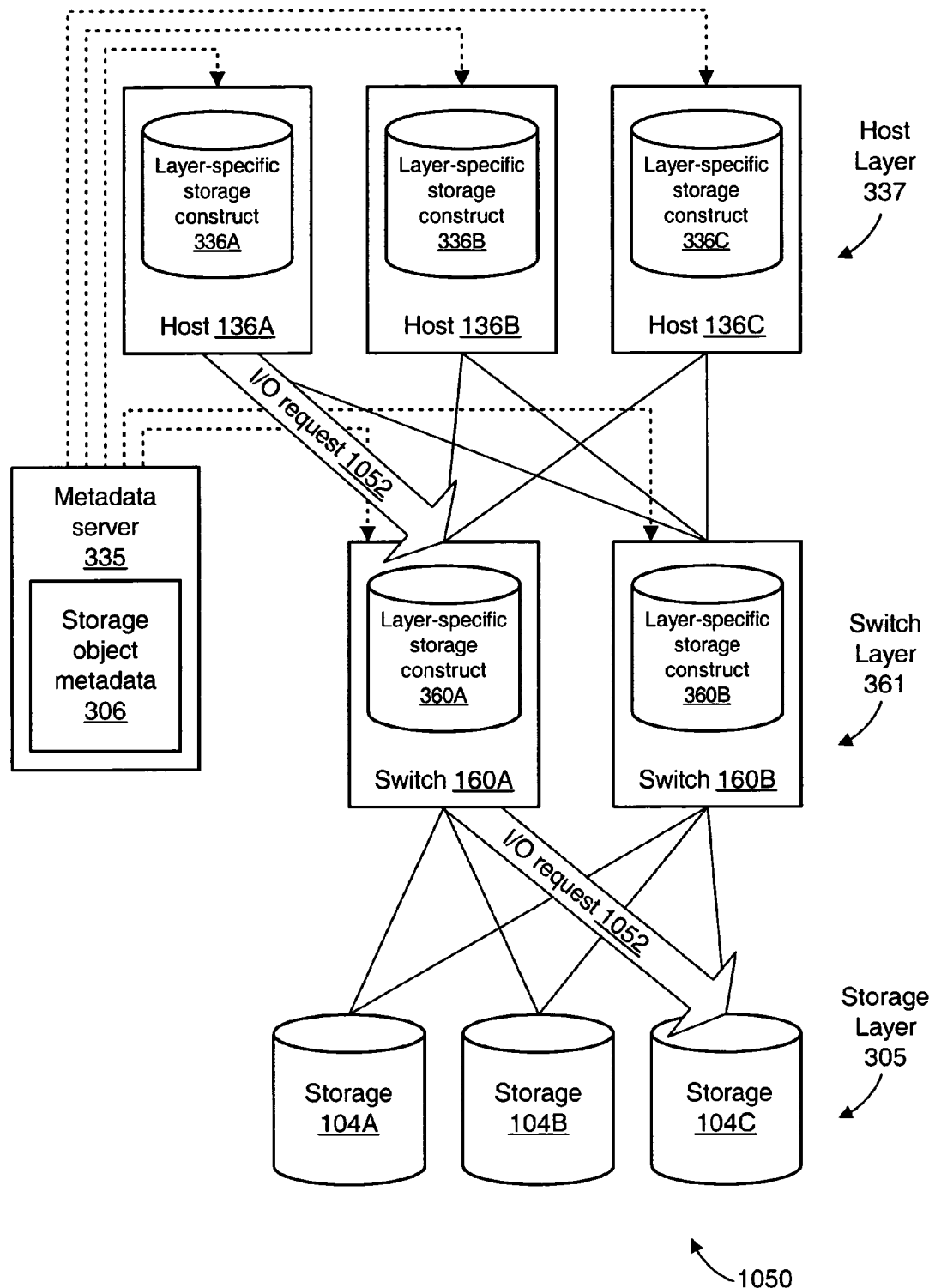
FIG. 14 is a block diagram illustrating an example of a multi-layer virtualization environment utilizing quality of service (QoS) for I/O according to one embodiment.

FIG. 13b is a flow diagram illustrating a method of multi-layer cooperation to achieve quality of service (QoS) requirements for an I/O task, according to one embodiment, and FIG. 14 illustrates an example of a multi-layer virtualization environment 1050 configured to support QoS for I/O according to one embodiment. In the multi-layer virtualization environment 1050, I/O requests may pass through multiple layers of virtualization and be processed by multiple storage entities. The various layers of the multi-layer virtualization environment 1050 may cooperate to ensure the quality of service of the I/O from end to end. As shown in FIG. 13b, a first storage entity may send a request for an I/O task to a second storage entity (block 10210). On receiving the request, in one embodiment the second storage entity may be configured to identify one or more quality of service requirements associated with the I/O task (block 10220), and to cooperate with a third storage entity to perform one or more I/O operations to meet the quality of service requirements (block 10240). For example, a host may be configured to communicate with one or more switches (e.g., using any desired protocol) to identify a particular switch best suited to satisfy the quality of service requirements for a given I/O task, and the switch in turn may be configured to communicate with one or more storage appliances and/or disk array devices to identify an appropriate storage appliance or disk array capable of delivering the required or requested level of service. In some embodiments, cooperation between entities at various layers may include an exchange of one or more messages between pairs of cooperating entities in different layers to establish an appropriate path or paths for performing I/O operations associated with the I/O task, and subsequently transmitting I/O requests and response along the selected path or paths. In addition, especially for I/O tasks that may require a relatively large number of I/O operations (e.g., reads or writes), in some embodiments a new I/O path may be selected for some I/O operations before the corresponding I/O task is completed, e.g., in response to a detection of a change in local conditions such as a load imbalance and/or a failure.

In one embodiment, an I/O request 1052 to perform an I/O task may comprise one or more quality of service parameters or requirements for the I/O task. The I/O task may require multiple I/O operations to be performed in some embodiments; for example, one I/O task may include replicating a volume, or synchronizing one version of a virtual storage object with another. The quality of service requirements may include, for example, one or more specifications of requirements and/or priorities for queuing, scheduling, multi-pathing and I/O path selection, resource (e.g., cache memory or available bandwidth) allocation, parallel reads from multiple mirrors, pre-fetching, and/or caching. For example, in some implementations, specific requirements for I/O paths such as a maximum number of hops or links, or a maximum acceptable read or write latency, may be provided, while in other implementations, one or more specific I/O paths may be identified (such as paths known to be reserved for high-priority tasks). Pre-fetching and/or caching requirements may require, for example, an identification of the specific storage entities that are capable of pre-fetching and/or caching objects or are most likely to be able to perform pre-fetch and cache operations based on current loads. The I/O request 1052 may be passed from a first storage entity (e.g., a host 136A) through additional layers of virtualized storage and their corresponding storage entities. In some embodiments, each of the storage entities receiving the I/O request 1052 may consider and attempt to satisfy the one or more quality of service requirements for the I/O task. In other embodiments, some of the storage entities may attempt to satisfy the requirements, while other storage entities may be configured to ignore the requirements.

In some embodiments, the quality of service requirements may be determined by an application generating the I/O request. In other embodiments, the quality of service requirements may be determined by a storage entity (e.g., a host 136A, 136B, 136C) at the highest virtualization layer and/or other storage entities at other virtualization layers. The quality of service requirements may be specified explicitly by the originating application in some embodiments, while in other embodiments, the requirements may be determined implicitly by examining factors such as the priority of the application, the priority of the host, and other appropriate factors.

In one embodiment, e.g., when each virtualization layer has a separate metadata server, a switch or other virtualization component may be provided with quality of service requirements for a virtual storage object such as a logical volume or a file system. That is, quality of service requirements may be specified at the virtual storage object, instead of or in addition to being specified for specific I/O tasks. The switch or other virtualization component may supply the quality of service requirements related to that virtual storage object to underlying components (e.g., a disk array) without requiring that the application supply information on each I/O.

A number of different types of metrics may be included in the QoS requirements of different applications. Some applications, such as real-time applications, may be more sensitive to latency (e.g., to maximum acceptable response times for individual requests or transactions) than to throughput (the overall rate at which requests or transactions are satisfied). In some embodiments, as part of QoS support, storage objects such as volumes that contain the data accessed by real-time applications or other latency-sensitive applications may be identified as being high priority objects, and various storage entities (such as switches, intelligent disk arrays or appliances) providing I/O to those objects may be configured to provide preferential treatment for I/Os targeted at the high priority objects. In some embodiments, the various storage entities and/or I/O paths within a multi-layer virtualization environment may be monitored so that the level of performance (e.g., latency and/or throughput) that may be supported on different alternative I/O paths may be determined or estimated, and high-priority I/O requests may be targeted to the I/O paths that have been identified as being capable of higher levels of service. Thus, for example, if two I/O paths through two different switches 160A and 160B are available from host 136A to the same underlying storage object, and switch 160A is determined to be less busy than switch 136B over a specified period such as the last minute, host 136A may be configured to direct or route a request from a high-priority application via switch 160A rather than via switch 160B. Performance metrics may be gathered by a particular storage entity in some embodiments either from a centralized storage system performance monitor, or from performance measurement agents or tools at the various storage entities in the different layers. In another embodiment where multiple I/O paths may be available to the same storage object from a host, a particular path or set of paths may be reserved for high-priority application requests. In some embodiments, a particular storage entity may obtain information about caching capabilities at other storage entities, e.g., from a cache manager, and may use the information to identify one or more additional storage entities that may help to satisfy the quality of service requirements associated with an I/O task. Efforts to provide desired quality of service may also include horizontal coordination between storage entities at the same layer in some embodiments: for example, a first host may request that data be cached at a second, less-lightly loaded host in order to help meet desired quality of service for an I/O task.

Exemplary Computing System Embodiments

Figure 15:
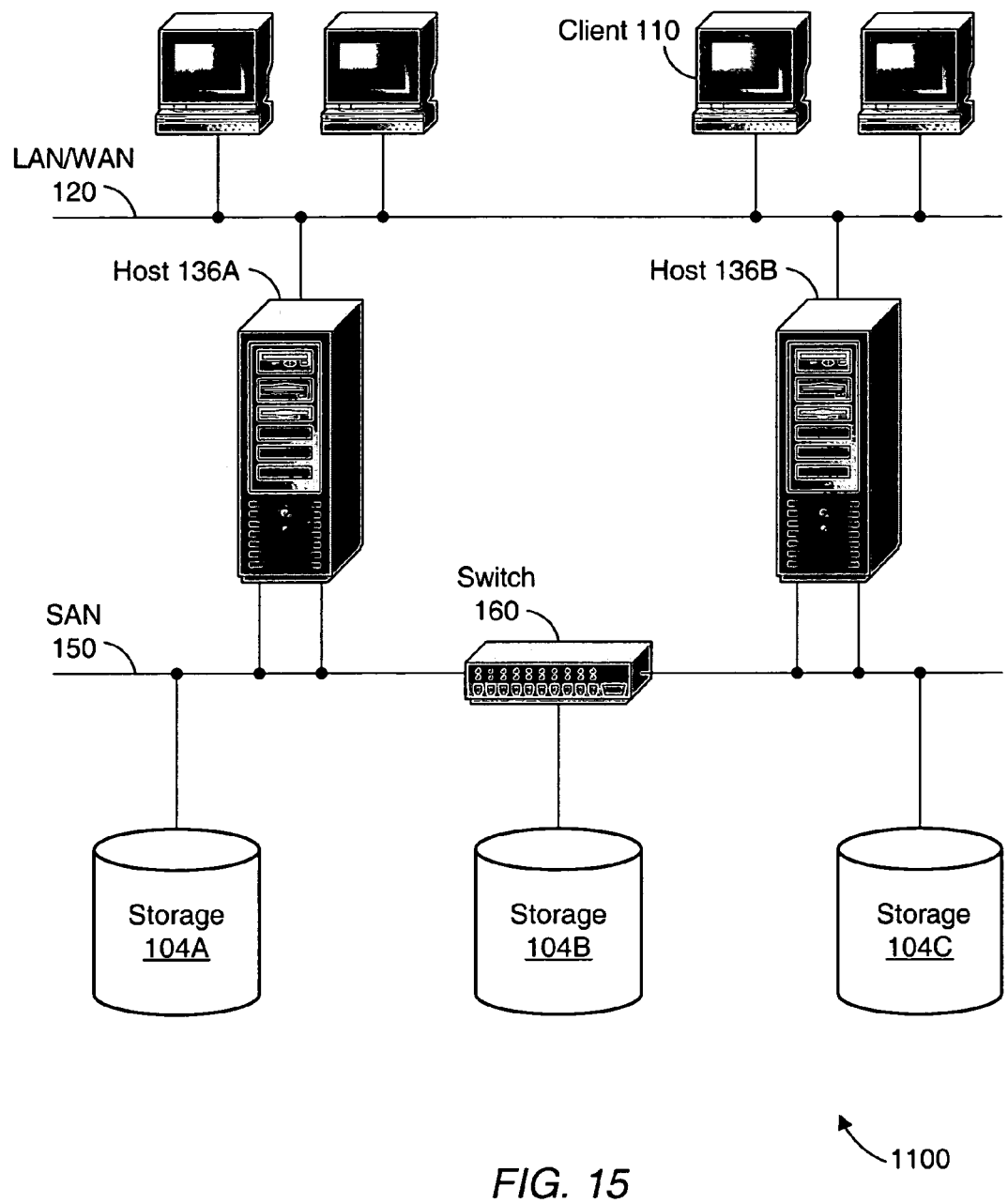
FIG. 15 is a block diagram illustrating one embodiment of a computing system.
Figure 18:
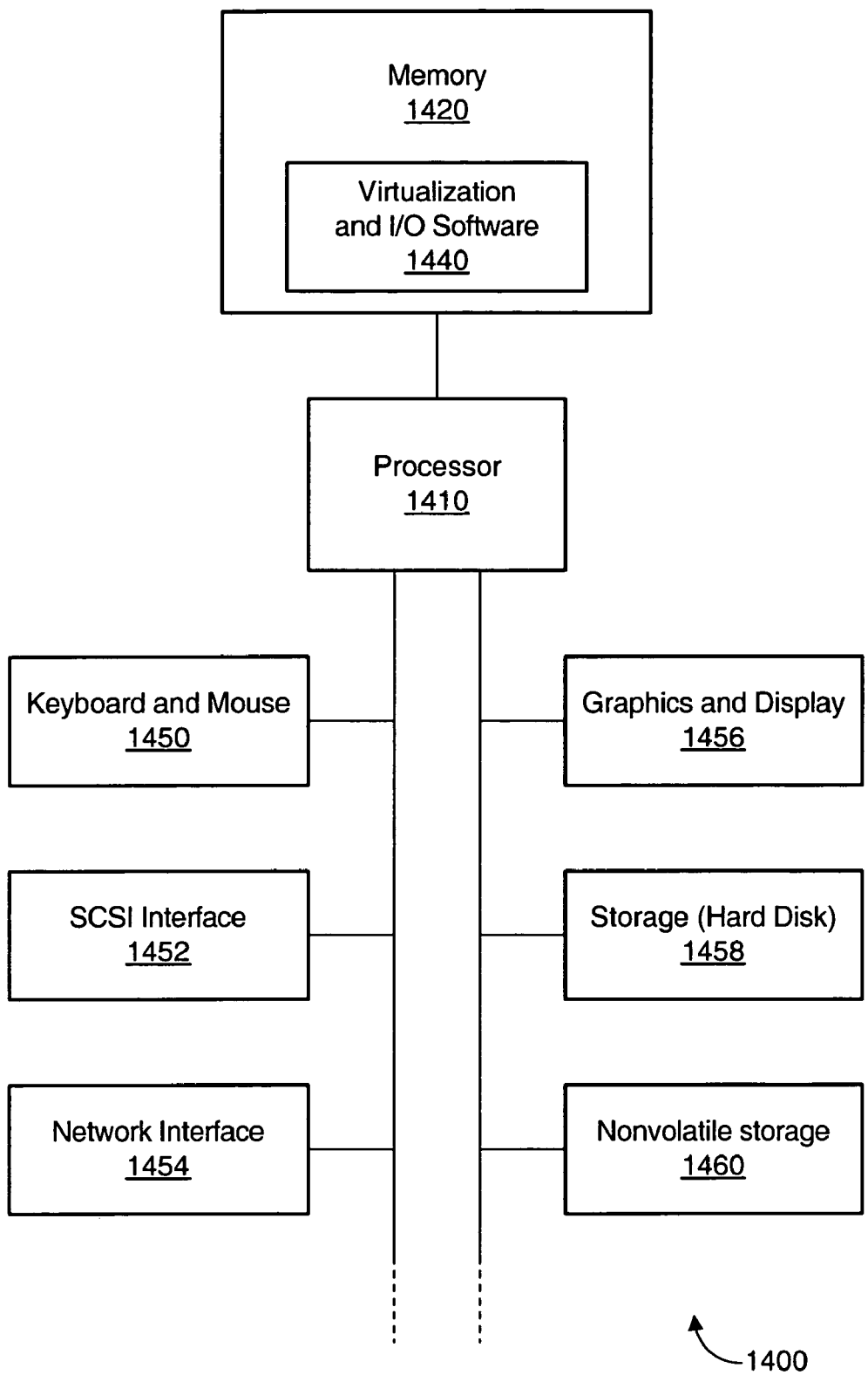
FIG. 18 is a block diagram illustrating one embodiment of an individual computer system.

The storage techniques described herein may be implemented in a number of different computing system architectures. FIG. 15 illustrates an example of a computing system 1100 according to one embodiment. The members of the computing system 1100 may include one or more volume clients 136 such as host 136A and host 136B. As members of computing system 1100, hosts 136A and 136B may be referred to as "nodes." Hosts 136A and 136B, which may typically be some type of application, data or file server, may operate independently of each other, or they may interoperate to form some manner of cluster. Hosts 136A and 136B are typically individual computer systems having some or all of the software and hardware components well known to those having skill in the art. FIG. 18 (described below) illustrates some of the features common to such computer systems. In support of various applications and operations, hosts 136A and 136B may exchange data over various communication links, for example, network 120, typically a local area network (LAN), e.g., an enterprise-wide intranet, or a wide area network (WAN) such as the Internet. Additionally, network 120 provides a communication path for various client computer systems 110 to communicate with hosts 136A and 136B. In addition to network 120, hosts 136A and 136B may communicate with each other over a private network (not shown) in one embodiment.

Other elements of computing system 1100 may include a storage area network (SAN) 150, SAN switch 160, and block storage devices 104. As described previously, storage devices (e.g., 104A, 104B, and 104C) may include various devices such as a tape library (typically including one or more tape drives), a group of disk drives (i.e., "just a bunch of disks" or "JBOD"), an intelligent storage array, and other suitable storage means. As shown in FIG. 15, both hosts 136A and 136B are coupled to SAN 150. SAN 150 is conventionally a high-speed network that allows the establishment of direct connections between storage devices 104 and hosts 136A and 136B. Thus, SAN 150 is shared between the clients and allows for the sharing of storage devices between the clients to provide greater availability and reliability of storage.

Although hosts 136A and 136B are shown connected to storage devices 104A, 104B, and 104C through SAN switch 160 and SAN 150, this need not be the case. Shared resources may be directly connected to some or all of the clients in the computing system, and computing system 1100 need not include a SAN. Alternatively, hosts 136A and 136B can be connected to multiple SANs. Additionally, SAN switch 160 can be replaced with a SAN router, a SAN hub, or some type of storage appliance.

In various embodiments, block virtualization may be implemented at various layers throughout the storage environment: at the application host level, e.g., hosts 136A and 136B; at the fabric switch or storage appliance level, e.g., SAN switch 160; and/or at the storage device level 104A-C. In some embodiments, a metadata server 335 and/or a volume server 135 may also be implemented at one or more hosts 136 and/or at one or more other devices.

Figure 16:
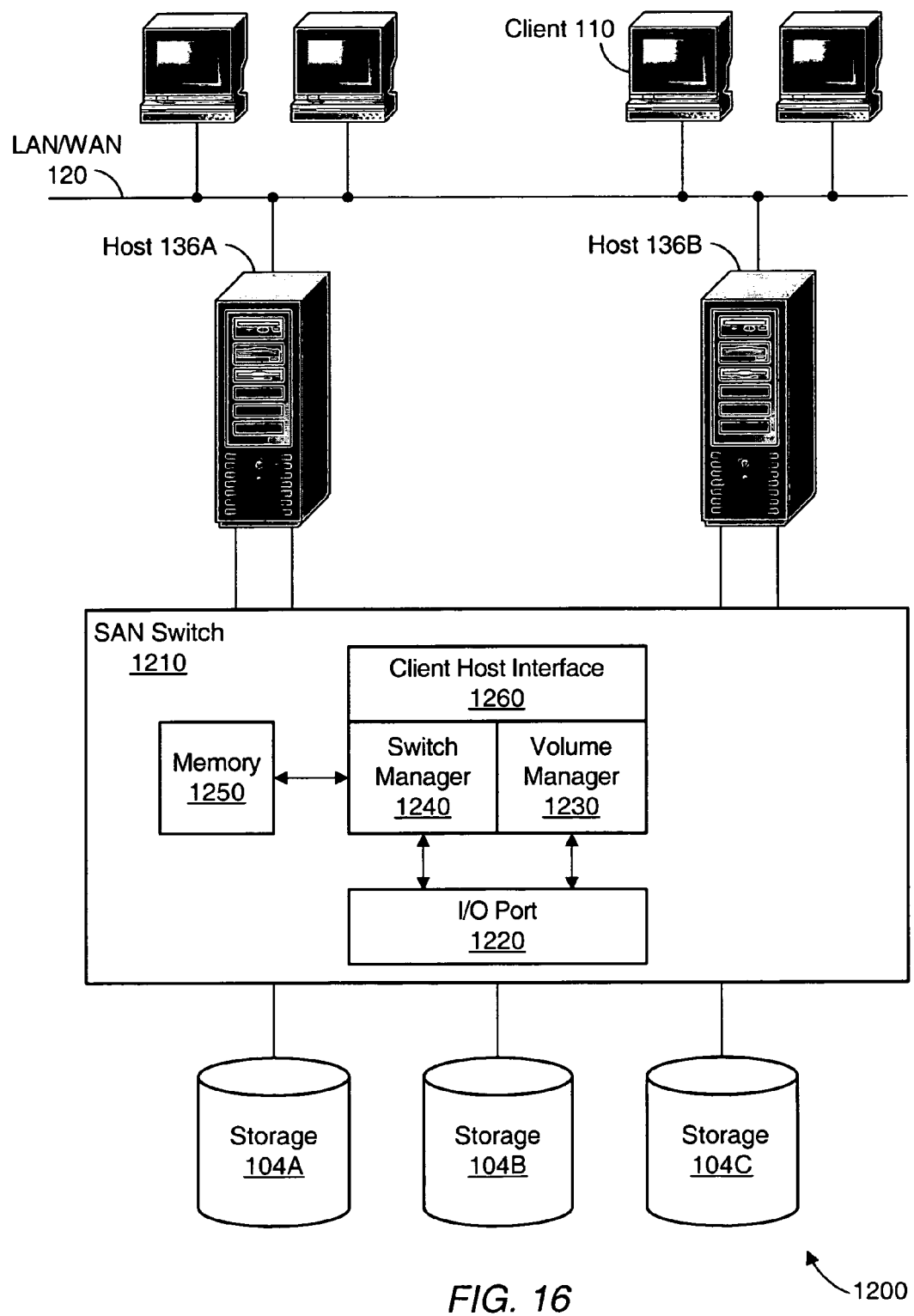
FIG. 16 is a block diagram illustrating one embodiment of a computing system configured to perform switch-based block virtualization.

FIG. 16 illustrates an example of a computing system 1200 according to one embodiment. In the example of FIG. 16, computing system 1200 includes two hosts 136A and 136B. Both hosts 136A and 136B may execute one or more application programs respectively. Such applications can include, but are not limited to, database management systems (DBMS), file servers, application servers, web servers, backup and restore software, customer relationship management software, and the like. The applications and other software not shown, e.g., operating systems, file systems, and applications executing on client computer systems 110 can initiate or request I/O operations against storage devices 104. These I/O operations typically include read and write operations to logical or virtual devices such as volumes, virtual LUNs, and/or virtual disks designed to appear and operate as SCSI LUNs.

SAN switch 1210 is an example of a storage appliance that can implement the systems and methods of the present invention. Other devices that can be utilized include a variety of devices such as general network switches, switch-routers, routers, router-switches and other storage network devices. The term "switch" is used in this specification to describe equipment used to direct information over a network based on address information. Those skilled in the art will understand that such equipment includes, for example, switches and routers. In one example, SAN switch 1210 presents the virtual disks to volume clients 136 and client computer systems 110.

In support of the virtualization scheme, SAN switch 1210 may include a volume manager 1230, switch manager 1240, client host interface 1260, memory 1250, and I/O port 1220. Although only one I/O port is illustrated, SAN switch 1210 typically includes multiple I/O ports, e.g., at least one port for each device attached to the switch. Moreover, the elements shown are merely illustrative, and those having ordinary skill in the art will recognize a variety of other architectures that can be used. For example, each port can have one or more associated processors for executing software performing volume manager 1230, switch manager 1240, and client host interface 1260 functionality. Data can be transmitted among ports using a switching fabric (not shown) implementing a crossbar, single-bus, multiple-bus, or shared-memory architecture. Additionally, volume manager 1230, switch manager 1240, and client host interface 1260 are each typically implemented as software, microcode, or some combination of the two executing on a general-purpose microprocessor, general-purpose microcontroller, ASIC, PLD, FPGA, or the like. In this manner, the hardware and/or software operates as an I/O processor. In some embodiments, the functionality of two or more of volume manager 1230, switch manager 1240, and client host interface 1260 is implemented in the same software and/or hardware. For example, volume manager 1230 and switch manager 1240 might be combined into a single software package. Additionally, there can be more than one instantiation of each of volume manager 1230, switch manager 1240, and client host interface 1260 in some implementations.

Volume manager 1230 enables physical resources configured in the computing system to be managed as logical devices. An example of software that performs some or all of the functions of volume manager 1230 is the VERITAS Volume Manager™ product provided by VERITAS Software Corporation. While volume manager 1230 organizes storage devices 104A, 104B, and 104C into one or more volumes, switch manager 1240 is responsible for presenting one or more volumes as one or more virtual disks. In one example, there is a one-to-one correspondence between volumes and virtual disks; however, other mappings may be used as well.

In one embodiment, switch manager 1240 maintains SAN switch 1210 data objects such as access control lists, quality of service information, virtual disk information and route information. Some or all of the information maintained by switch manager 1240 can be stored in memory 1250, which can be a disk drive, a random access memory, a flash memory, or some other suitable storage medium. A virtual disk may be created by defining its SCSI characteristics and its mapping to a volume established by volume manager 1230. SCSI characteristics may include block size, device size, inquiry data, and mode pages. In one embodiment, the virtual disk is a computing system wide entity in that its definition does not bind it to any specific appliance node. A route to the device can also be created. In general, a route binds a virtual disk to a specific LUN on a specific port. Switch manager 1240 receives and processes one or more I/O interface commands (e.g., SCSI commands), as part of its virtual disk maintenance functionality.

A SCSI target device contains one or more logical units (LUNs) and target ports (sometimes referred to as targets) and receives device service and task management requests for processing. A logical unit is an externally addressable entity within a target that implements a SCSI device model and contains a device server. A device server is an object within a logical unit that executes SCSI tasks according to the rules of task management. Devices which comply with SCSI standards may include: direct access devices, sequential access devices, printer devices, processor devices, write once read multiple devices, magnetic storage devices, compact disk (CD) devices, scanner devices, optical memory devices, media changer devices, communication devices, storage array devices, enclosure services devices, router devices, storage appliances, and simplified direct-access devices. The aforementioned devices may be used as shared resources and shared data resources.

Switch manager 1240 may utilize volume information from volume manager 1230 and store it along with the information it maintains in memory 1250. For example, since volume manager 1230 is typically responsible for creating and maintaining snapshot volumes, it can provide information about a snapshot volume to switch manager 1240. Switch manager 1240 in turn stores the information in a way that is accessible using one or more I/O interface commands. For example, switch manager 1240 includes the virtual device information from volume manager 1230 in inquiry data that is accessible using the SCSI-3 INQUIRY command. In this way, additional information about the virtual disks and their related volumes is made accessible to volume clients 136A and 136B as well as client computer systems 110. For example, an application operating on volume client 136, e.g., a backup and restoration application, can query SAN switch 1210 using a SCSI-3 INQUIRY to gather information about the relationship among virtual disks and/or corresponding volumes.

Client host interface 1260 provides a user interface, e.g., a command line interface or a graphical user interface, for the management of volume manager 1230, switch manager 1240, and/or other features of SAN switch 1210. Additionally, client host interface 1260 can serve as an additional interface for accessing and/or modifying information stored in memory 1250, such as the aforementioned virtual device information.

Figure 17:
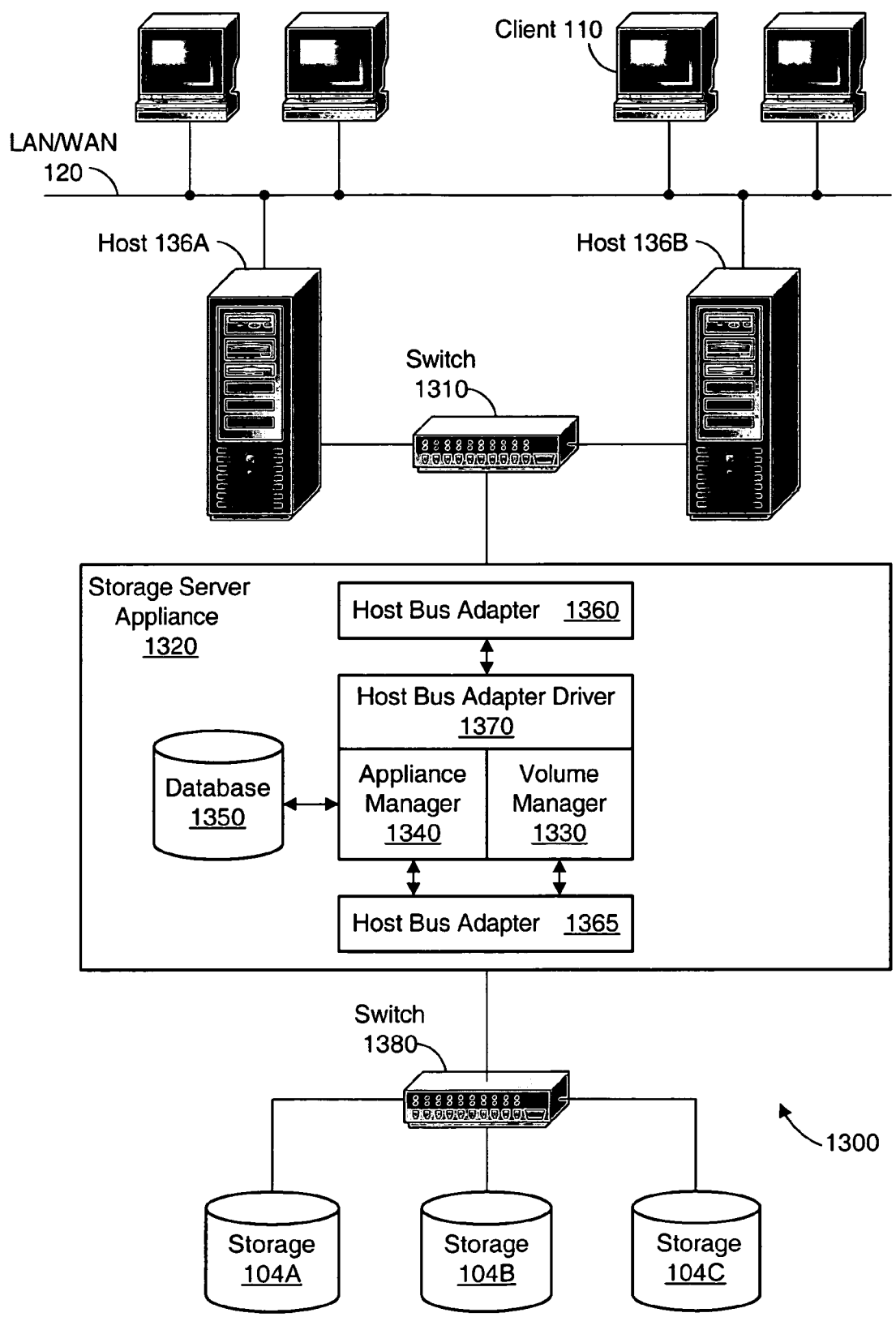
FIG. 17 is a block diagram illustrating one embodiment of a computing system configured to perform appliance-based block virtualization.

FIG. 17 illustrates an embodiment including a storage server appliance 1320. In general, storage server appliance 1320 differs from SAN switch 1210 in that SAN switch 1210 may be a specialized piece of hardware, while storage server appliance 1320 is typically a conventional computer system, e.g., a server, that operates additional software to provide storage server appliance functionality. An example of the type of software used to provide such functionality on conventional server hardware is the VERITAS ServPoint™ Appliance Software for SAN product provided by VERITAS Software Corporation. To enhance storage server appliance 1320's integration with computing system 1300, e.g., to provide additional virtualization information to applications executing on volume clients 136A and 136B, the systems, methods, and software of the present invention can be utilized.

Computing system 1300 may utilize two switches 1310 and 1380 to provide front side and back side storage networks. Switch 1380 links all of the storage devices 104A, 104B, and 104C to the storage server appliance 1320. Similarly, switch 1310 links all of the storage clients, e.g., volume clients 136A and 136B, to storage server appliance 1320. For added fault tolerance, multiple switches and data paths can be used as is well known to those having ordinary skill in the art.

Switch 1310 is coupled to host bus adapter 1360 of storage server appliance 1320. Host bus adapter 1360 is typically a SCSI or Fibre Channel adapter supporting a high speed/bandwidth connection. Host bus adapter driver 1370 supports I/O operations from storage clients, and interface with appliance manager 1340 and volume manager 1330. In general, appliance manager 1340 and volume manager 1330 operate in much the same manner as switch manager 1240 and volume manager 1230. In particular, appliance manager 1340 maintains data objects such as access control lists, quality of service information, virtual disk information (including the specialized information described above) and route information. Such information is stored in database 1350, which is typically stored on one or more disk drives local to storage server appliance 1320. In this manner, certain hardware and/or software of storage server appliance 1320 may operate as an I/O processor.

FIG. 18 illustrates a block diagram of a typical computer system 1400 for implementing embodiments of the systems and methods described above for multi-layer block virtualization. For example, computer system 1400 can be illustrative of one of the previously described cluster nodes, i.e. of hosts 136. Computer system 1400 may also be illustrative of clients 110. Computer system 1400 includes a processor 1410 and a memory 1420 coupled by a communications bus. Processor 1410 can be a single processor or a number of individual processors working together. Memory 1420 is typically random access memory (RAM), or some other dynamic storage device, and is capable of storing instructions to be executed by the processor, e.g., virtualization and I/O software 1440. Memory 1420 is also used for storing temporary variables or other intermediate information during the execution of instructions by the processor 1410.

Computer system 1400 may also include devices such as keyboard & mouse 1450, SCSI interface 1452, network interface 1454, graphics & display 1456, hard disk 1458, and other nonvolatile storage 1460, all of which are coupled to processor 1410 by a communications bus. In various embodiments, nonvolatile storage 1460 may include optical media devices such as read-only or writable CD or DVD, solid-state devices such as nonvolatile RAM, or any other suitable type of nonvolatile storage. It will be apparent to those having ordinary skill in the art that computer system 1400 can also include numerous elements not shown in the figure, such as additional storage devices, communications devices, input devices, and output devices, as illustrated by the ellipsis shown. An example of such an additional computer system device is a Fibre Channel interface.

Those having ordinary skill in the art will readily recognize that the techniques and methods discussed above can be implemented in software as one or more software programs, using a variety of computer languages, including, for example, traditional computer languages such as assembly language, Pascal, and C; object oriented languages such as C++ and Java; and scripting languages such as Perl and Tcl/Tk. In some embodiments, software 1440 may comprise program instructions executable, for example by one or more processors 1410, to perform any of the storage functions or methods described above. Also, in some embodiments software 1440 can be provided to the computer system via a variety of computer-accessible media including electronic media (e.g., flash memory), magnetic storage media (e.g., hard disk 1458, a floppy disk, etc.), optical storage media (e.g., CD-ROM 1460), and communications media conveying signals encoding the instructions (e.g., via a network coupled to network interface 1454). In some embodiments, separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above can be utilized in a variety of different storage devices and computing systems with variations in, for example, the number of nodes, the type of operation of the computing system, e.g., cluster operation (failover, parallel, etc.), the number and type of shared data resources, and the number of paths between nodes and shared data resources.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A system comprising:
 a first layer of virtualized storage, wherein the first layer of virtualized storage comprises a first storage entity; and
 a second layer of virtualized storage, wherein the second layer of virtualized storage comprises a second storage entity;
 wherein the first storage entity is configured to request the second storage entity to store data in a cache, wherein the cache is managed by the second storage entity, and wherein the cache is readable by the first storage entity.

2. The system of claim 1,
wherein the first storage entity or the second storage entity comprises a host.
3. The system of claim 1,
wherein the first storage entity or the second storage entity comprises a storage appliance.
4. The system of claim 1,
wherein the first storage entity or the second storage entity comprises a switch.
5. The system of claim 1,
wherein the first storage entity or the second storage entity comprises a disk array.
6. The system of claim 1, further comprising:
a third layer of virtualized storage, wherein the third layer of virtualized storage comprises a third storage entity, and wherein an I/O path from the first storage entity to the second storage entity comprises the third storage entity;
wherein the first storage entity is configured to request the third storage entity to store the data in an additional cache, wherein the additional cache is managed by the third storage entity, and wherein the additional cache is readable by the first storage entity;
wherein the second storage entity is configured to stop storing the data in the cache in response to storage of the data in the additional cache.
7. The system of claim 1,
wherein the first storage entity is configured to identify a region of storage comprising a block of data likely to be accessed by the first storage entity; and
wherein the first storage entity is configured to request the second storage entity to pre-fetch the block of data from the region of storage and store the data in the cache.
8. The system of claim 7,
wherein the second storage entity is configured to determine whether to pre-fetch the data from the region of storage based on a current load level at the second storage entity.
9. The system of claim 7,
wherein the second storage entity is configured to determine whether to pre-fetch the data from the region of storage based on an estimated expense of the prefetch operation.
10. The system of claim 1,
wherein the second storage entity is configured to identify a block of data likely to be accessed by the first storage entity, pre-fetch the block of data and store the block in the cache.
11. The system of claim 1,
wherein the first layer of virtualized storage comprises a third storage entity; and
wherein the first storage entity is configured to request the third storage entity to store additional data in an additional cache, wherein the additional cache is managed by the third storage entity, and wherein the additional cache is readable by the first storage entity.
12. The system of claim 11,
wherein the first storage entity is configured to identify a region of storage comprising one or more blocks of data likely to be accessed by the first storage entity; and
wherein the first storage entity is configured to request the third storage entity to pre-fetch the data from the region of storage and store the data in the additional cache.
13. The system of claim 1, further comprising:
a cache manager configured to provide information to the first storage entity indicative of a caching capability of the second storage entity.

14. A method, comprising:
a first storage entity requesting a second storage entity to store data in a cache managed by the second storage entity, wherein a first layer of virtualized storage comprises the first storage entity, and wherein a second layer of virtualized storage comprises the second storage entity; and
the first storage entity reading the data from the cache.
15. The method of claim 14, further comprising:
the first storage entity requesting a third storage entity to store the data in an additional cache, wherein a third layer of virtualized storage comprises the third storage entity, wherein an I/O path from the first storage entity to the second storage entity comprises the third storage entity, wherein the additional cache is managed by the third storage entity, and wherein the additional cache is readable by the first storage entity; and
the second storage entity discontinuing storing the data in the cache in response to the first storage entity requesting the third storage entity to store the data in the additional cache.
16. The method of claim 14, further comprising:
identifying a region of storage comprising one or more blocks of data likely to be accessed by the first storage entity;
the second storage entity pre-fetching the one or more blocks of data from the region of storage; and
the second storage entity storing the data in the cache.
17. The method of claim 14, further comprising:
the first storage entity requesting a third storage entity to store additional data in an additional cache, wherein the additional cache is managed by the third storage entity, wherein the first layer of virtualized storage comprises the third storage entity, and wherein the additional cache is readable by the first storage entity.
18. A computer-accessible storage medium storing program instructions, wherein the program instructions are computer-executable to:
send a request from a first storage entity to a second storage entity to store data in a cache managed by the second storage entity, wherein a first layer of virtualized storage comprises the first storage entity, and wherein a second layer of virtualized storage comprises the second storage entity; and
reading the data at the first storage entity from the cache.
19. The computer-accessible storage medium of claim 18, wherein the instructions are further computer-executable to:
send a request from the first storage entity to a third storage entity to store the data in an additional cache, wherein a third layer of virtualized storage comprises the third storage entity, wherein an I/O path from the first storage entity to the second storage entity comprises the third storage entity, wherein the additional cache is managed by the third storage entity, and wherein the additional cache is readable by the first storage entity; and
discontinue storing the data in the cache managed by the second storage entity in response to the first storage entity requesting the third storage entity to store the data in the additional cache.
20. The computer-accessible storage medium of claim 18, wherein the instructions are further computer-executable to:
identify a region of storage comprising one or more blocks of data likely to be accessed by the first storage entity;
pre-fetch the one or more blocks of data at the second storage entity from the region of storage; and
store the data in the cache managed by the second storage entity.

* * * * *